May 20, 1952  O. S. FIELD ET AL  2,597,784
AIRCRAFT NAVIGATION AND INSTRUMENT LANDING SYSTEM
Filed Oct. 11, 1944  5 Sheets-Sheet 5
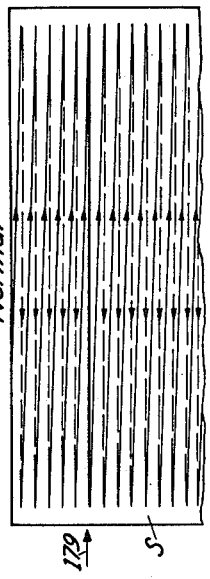
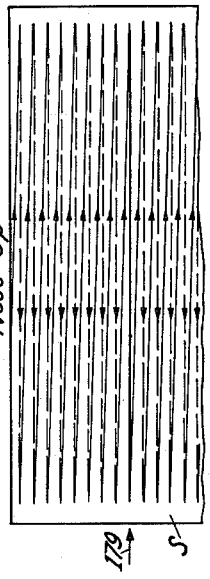
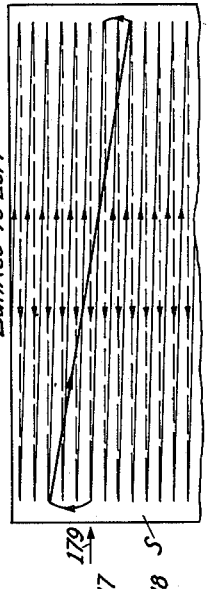
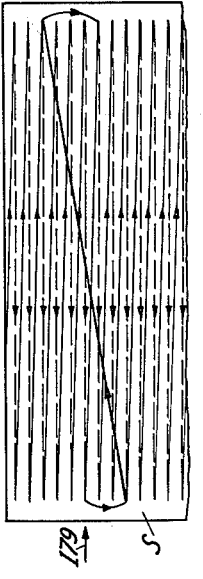
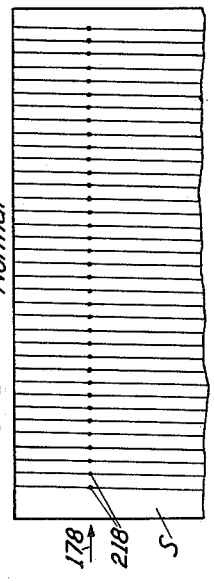
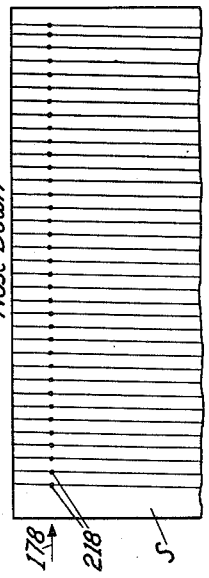
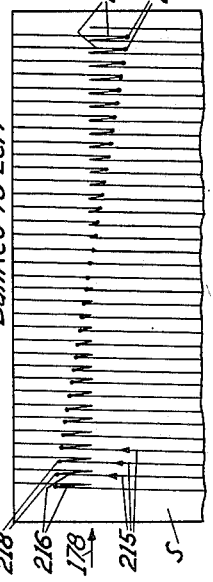
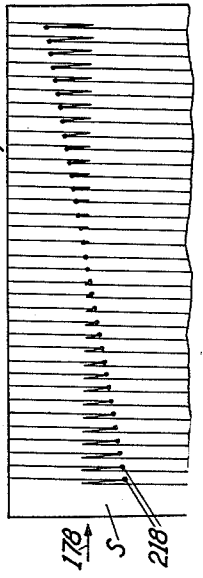
Inventors
O. S. Field and S. N. Wight
By Neil W. Preston,
Their Attorney Patented May 20, 1952

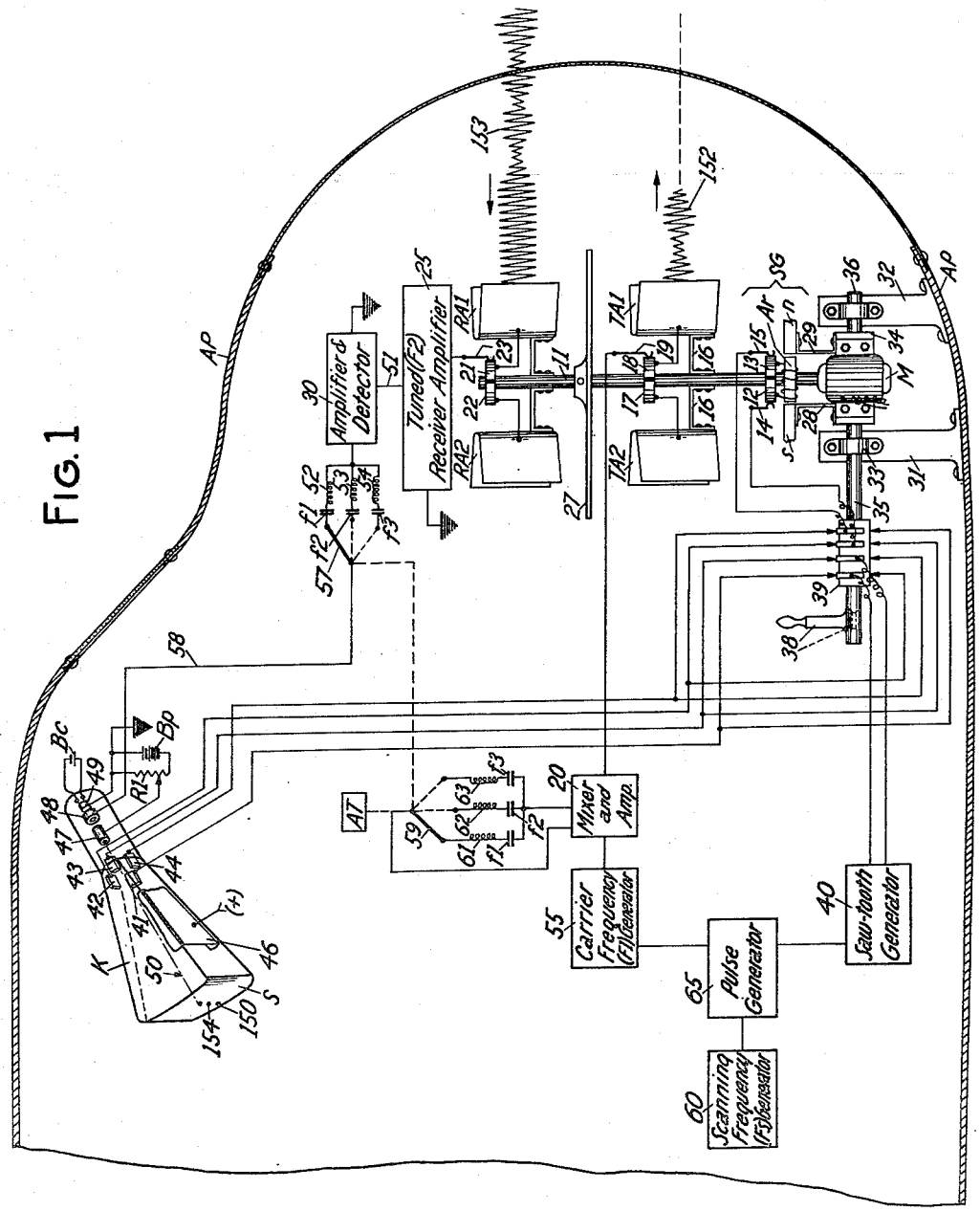

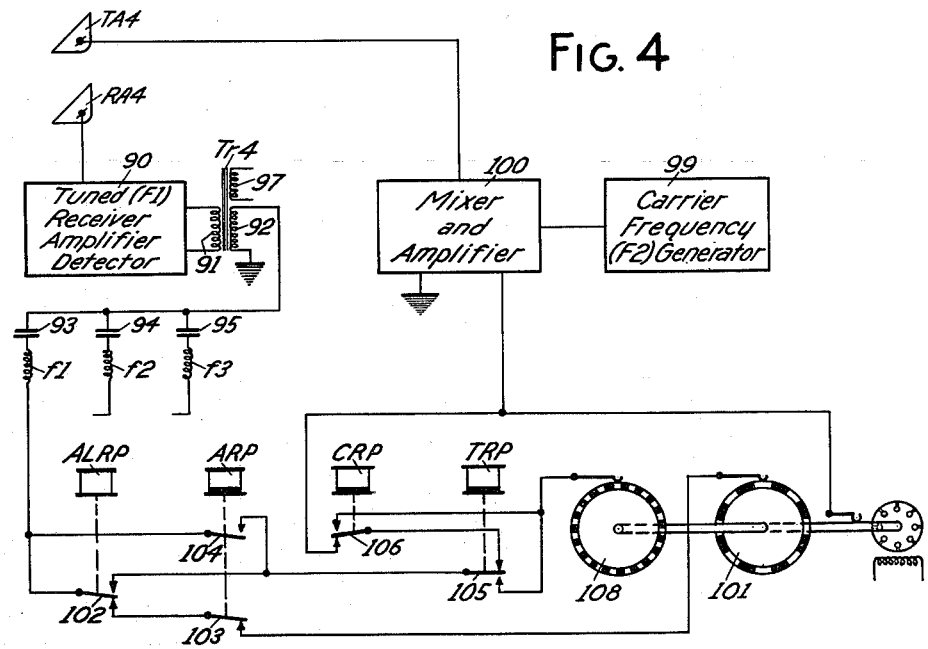
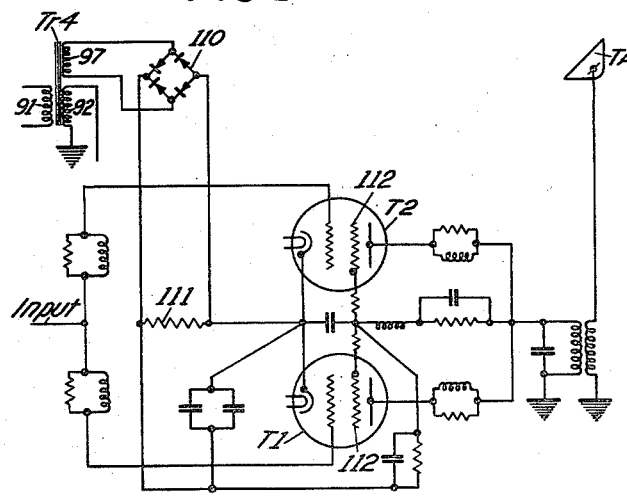
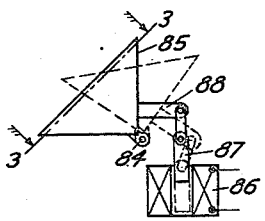
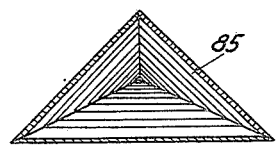

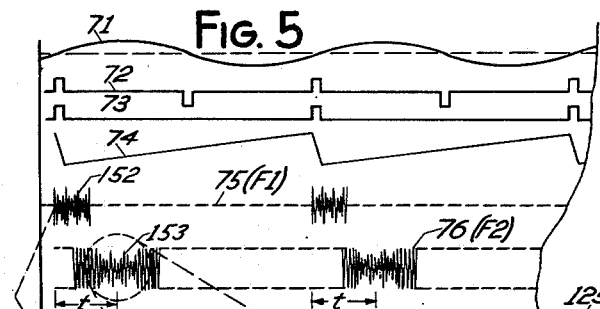
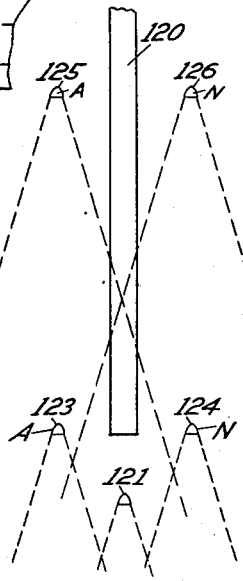
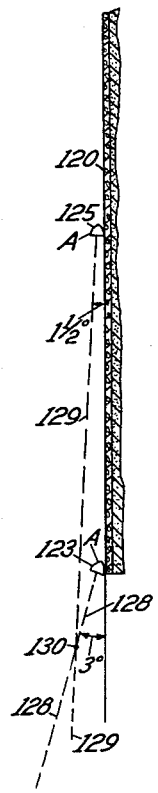
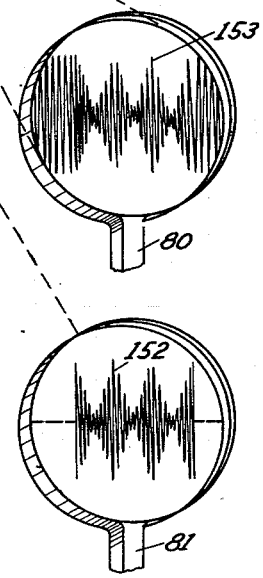
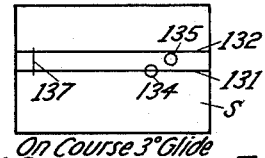
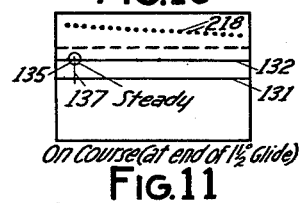
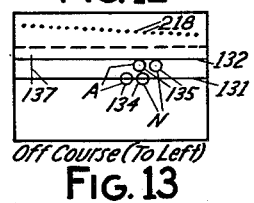
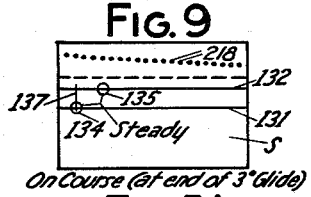
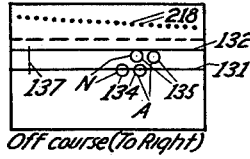
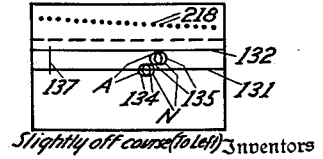
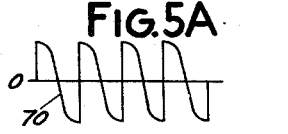

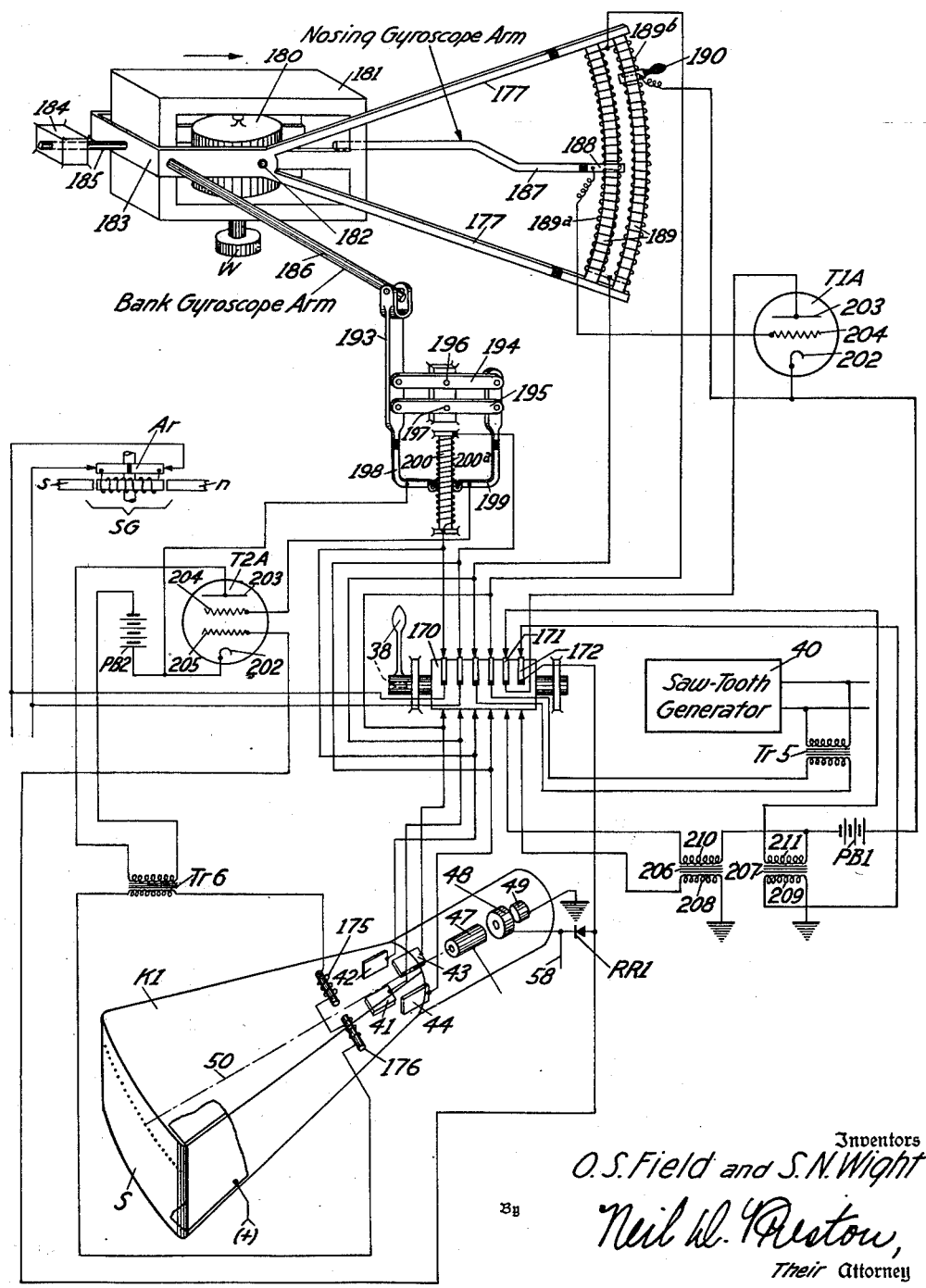

2,597,784

UNITED STATES PATENT OFFICE 2,597,784

AIRCRAFT NAVIGATION AND INSTRUMENT LANDING SYSTEM

Oscar S. Field and Sedgwick N. Wight, Rochester, N. Y., assignors to General Railway Signal Company, Rochester, N. Y.

Application October 11, 1944, Serial No. 558,256

14 Claims. (Cl. 343—11)

This invention relates to blind route flying and blind landing instrumentalities and more particularly to a system for this purpose wherein the field of view ahead of the airplane is pictorially reproduced by mechanically scanning and plotting this field of view in one plane and by plotting in another plane distances proportional to the distance to the radio radiator on the ground and reproduced on the screen of a cathode ray oscillograph.

Insofar as route flying is concerned this application is an improvement over the prior application of Field, Wight and Saint, Ser. No. 517,814, filed January 11, 1944, which has resulted in Patent No. 2,463,094, dated March 3, 1949, and the prior application of Dicke, Ser. No. 532,181, filed April 21, 1944, which has resulted in Patent No. 2,439,846, dated April 20, 1948, whereas the portion of the disclosure relating to blind landing is an improvement over the prior application of Field and Wight, Ser. No. 548,660, filed August 9, 1944, which has resulted in Patent No. 2,463,095, dated March 3, 1949, and no claim is made herein to that which is disclosed in any of these applications.

In the prior applications of Field, Wight and Saint, and of Dicke, apparatus for mechanically scanning at both a low speed and a high speed and in two different planes were provided. According to one embodiment of the present invention, however, mechanical scanning by a scanning antenna is in but one plane at a relatively low rate, and scanning for the other plane of the screen of a cathode-ray tube is provided electronically at a relatively high rate whereby distances measured by the excursion times of radio pulses are plotted.

In accordance with the present invention it is proposed to mechanically scan horizontally and plot vertically in accordance with the distance the scanned radiator is from the airplane, such scanning being preferably used for route flying. For blind landing it is proposed to mechanically scan vertically and then plot along horizontal lines on the screen of the cathode-ray oscillograph an image at a distance from one edge of the screen dependent on the distance from the airplane to the ground located radiator that is being scanned.

Another object of the present invention resides in the provision of means for coding the radiated energy that is radiated from radio radiators located on opposite sides of a landing strip of an airport, by coding of the radiators on one side of the landing strip to the code character A and by coding the radiators on the opposite side of the landing strip to the code character N as a result of which if two such ground located radio radiators are reproduced on the screen at the same point the codes of the two images will blend into each other to render the image non-coded.

Another object of the present invention resides in the provision of lines and marks on the cathode-ray tube screen whereby the pilot will be informed during a landing operation as to whether he is lined up straight with the landing strip upon which he is to land and whether or not he is following a prescribed glide path and also when he reaches the end of such glide path where his wheels will just touch the ground.

Another object of the present invention resides in the provision of means including mechanical scanning means on an airplane which will radiate forwardly of the airplane successive energy pulses successively in different directions and to provide receiving apparatus for detecting the time of return of pulses either originating on the ground or reflected from a ground located radio reflector, as a result of which the time of radiation from the airplane to the ground located radiator and from the ground located radiator to the airplane may be measured to determine the distance from the airplane to such ground located radiator. More specifically, it is proposed to provide a double antenna scanning apparatus of which one antenna is used to emit ultra-high-frequency radio pulses intermittently and to employ the other antenna for receiving radio energy emitted by a ground located radio radiator rendered active in response to the reception of such pulses. It may be desirable to accomplish these two functions by the same antenna. In one form of the invention it is proposed to emit modulated ultra-high-frequency radio energy intermittently by the airplane carried apparatus and to normally radiate unmodulated ultra-high-frequency radio energy by each of the various ground located radiators and to provide other means at the ground located radio radiator for modulating the emitted ultra-high-frequency radio energy only when correspondingly modulated radio energy reaches such ground located apparatus, the airplane carried apparatus being so constructed that it will only manifest the reception of ultra-high-frequency energy when such energy has been modulated at the same frequency as was the radio energy emitted by that airplane carried apparatus.

Another object of the present invention resides in the provision of means to determine the frequency of modulation of the radio energy emitted by the airplane in accordance with the altitude at which the airplane is flying which is preferably accomplished by inserting tuned units in the transmitting and receiving circuits through the medium of altimeter controlled contacts.

Another object and purpose of the present invention resides in the provision of means for so mounting the mechanical scanning apparatus on the airplane that it may at one time mechanically scan in one plane and at another time may mechanically scan in a plane substantially at right-angles to such one plane, and to provide means for making the necessary circuit changes to cause the direction of fast scanning and slow scanning of the electron beam in the cathode-ray tube to be changed correspondingly.

Another object of the present invention resides in the provision of suitable coding means for each of the ground located radio radiators along the route so that the emitted energy may be coded to identify that radiator substantially in accordance with the teachings of the prior application of Field, Wight and Saint, above referred to, to which attention is directed and which constitutes a portion of the system of the present invention.

Another object of the present invention resides in the provision of suitable means for using a portion of the same cathode-ray tube screen that is used for blind flying and blind landing to display thereon an artificial horizon, together with means for so displaying the artificial horizon in the upper or any other portion of the cathode-ray tube screen irrespective of whether the apparatus is adjusted to its horizontal mechanical scanning or its vertical mechanical scanning condition.

Other objects, purposes and characteristic features of the present invention will in part be described hereinafter and will in part be obvious from this description in combination with the accompanying drawings, in which:

Fig. 1 illustrates one embodiment of airplane carried apparatus embodying the present invention with the artificial horizon display apparatus omitted;

Fig. 2 shows a side elevation of a ground located radio reflector together with means for mechanically operating such reflector to effective and non-effective positions in accordance with a prescribed code;

Fig. 3 is a cross-sectional view of the reflector shown in Fig. 2 along the dotted line 3—3 when viewed in the direction of the arrows;

Fig. 4 shows conventionally one form of ground located radio receiving and radio transmitting apparatus constituting the necessary apparatus for one route defining radio radiator;

Fig. 5 shows graphs to illustrate sine-wave sweep-voltage frequency, pulsing current of the same frequency, a rectified pulse frequency wave, a saw-tooth wave, an intermittent radiated carrier frequency wave, and a continuous but intermittently modulated received carrier frequency radio wave, together with graph magnifying glasses to show a portion of these graphs enlarged;

Fig. 5A shows the voltage graph for low speed scanning on a different scale than is used in Fig. 5;

Fig. 6 illustrates a landing strip provided with two radio radiators coded at an "A" code and two radio radiators coded at an "N" code together with the fluorescent screen S of the cathode-ray tube K of Fig. 1, illustrating how these ground located radio radiators may be visually displayed on the fluorescent screen;

Fig. 7 illustrates a side view of the landing strip shown in Fig. 6 illustrating glide paths for landing purposes disposed at two different angles with respect to the landing strip;

Figs. 8 to 13 illustrate the same fluorescent screen as shown in Fig. 6 with six different landing indications depicted thereon;

Fig. 14 illustrates a modification of the Fig. 4 structure which provided additional means for rendering the ground radiating radio active only when energy emitted from an airplane is received;

Fig. 15 illustrates conventionally all of the apparatus of Fig. 1 (parts omitted) and illustrates additional apparatus superimposed thereon for visually indicating an artificial horizon on the upper part of the screen, as determined by an airplane carried gyroscope;

Fig. 16 shows the artificial horizon image in the upper portion of the screen when the airplane is flying and banked level and under high speed vertical scanning conditions;

Fig. 17 shows the artificial horizon image under similar conditions as in Fig. 16 except that the airplane is nosing downwardly;

Fig. 18 shows the artificial horizon image under similar conditions as in Fig. 16 except that the airplane is banking toward the left;

Fig. 19 shows the artificial horizon image under similar conditions as in Fig. 18 except that the airplane is banking toward the right;

Figs. 20–23 show artificial horizon indications the same as those shown in Figs. 16–19 except that high speed scanning is in a horizontal plane instead of a vertical plane.

*Airplane carried structure*

In accordance with one form of the present invention all airplanes are preferably equipped with suitable radio transmitting apparatus and suitable radio receiving apparatus. Although, as shown the radio transmitting and radio receiving antennas TA and RA are of the scanning type it should be understood that one of these antennas may be stationary, if desired. Also, one may be omitted and the retained one may be used alternately for transmitting and receiving. More specifically, the transmitting antennas TA1 and TA2 are supported by a vertical shaft 11, as through the medium of suitable brackets 16, so as to be displaced substantially 180° with respect to each other so that upon rotation of this shaft 11 these antennas successively scan horizontally the field of view ahead of the airplane AP. As pointed out later this shaft is at times supported horizontally to scan vertically. This shaft 11 also supports receiving antennas RA1 and RA2 which are similarly supported by this shaft. This shaft 11 also supports an armature Ar of a sweep-voltage generator SG including a permanent magnet field structure having poles s and n and a commutator including segments 12 and 13 which are engaged by stationary brushes 14 and 15. These brushes 14 and 15 are not so oriented with the field structure n–s as to produce direct current as is usually the case but are so oriented as to commutate the current when the voltage is a maximum, this in order to create an alternating sweep voltage of the wave form substantially as shown in Fig. 5A of the drawings.

The transmitting antennas TA1 and TA2, which are preferably of parabolic gutter shape, are provided with a similar commutator including commutator segments 17 and 18 which cooperate with a single fixed brush 19 so as to apply the radio transmitting energy derived from mixer and amplifier 20 only to the forwardly disposed antenna TA1 or TA2 as the shaft 11 is rotated. In a similar manner the receiving antennas RA1 and RA2 are provided with a commutator including commutator segments 21 and 22 which cooperate with a single stationary brush 23 which conducts the received radio energy to the receiver amplifier 25 tuned to a suitable carrier frequency such as frequency F2. As illustrated the radio transmitting antennas TA1 and TA2 are separated from the radio receiving antennas RA1 and RA2 by a suitable shield 27 which has been shown mounted on the shaft 11, but which in practice may be supported by a stationary support.

The shaft 11 is supported in the bearings of the driving motor M which driving motor M also supports the permanent magnet field structure n-s of the sweep generator SG as by brackets 28 and 29. This driving motor M is supported pivotally in bearings 33 and 34 so as to be rotatable about an axis parallel to the flight axis of the airplane AP. As illustrated brackets 31 and 32 support the bearing blocks 33 and 34 and these bearing blocks 33 and 34 rotatably support stub shafts 35 and 36 which are bolted or otherwise secured to the motor M so as to constitute the pivotal supporting means for the motor M as above mentioned.

The stub shaft 35 is provided with a handle 38 which is shown in its normal route flying position in solid lines and which has been shown in its 90° displaced blind landing position by the dotted lines 38. On the stub shaft 35 is secured an insulating drum 39 provided with suitable contact segments of conducting material directly connected to leads extending from the sweep voltage generator SG and from the saw-tooth generator 40. The sweep plates 41, 42, 43 and 44 of the cathode-ray tube K are connected to brushes shown by arrows so that connections may be made in two different relationships depending upon whether the handle 38 assumes its solid line or its dotted position. In other words, when the handle 38 assumes its solid line position the lead wires from the scanning generator SG connect to the horizontal sweep plates 42 and 44 whereas the saw-tooth generator 40 is then connected to the vertical sweep plates 41 and 43. If, however, the handle 38 is moved to its dotted position the sweep generator SG will be connected to the vertical sweep plates 41 and 43 whereas the saw-tooth generator 40 will be connected to the horizontal sweep plates 42 and 44 of the cathode-ray tube or kinescope K. This kinescope K includes the usual fluorescent screen S and anode 46 and an electron-gun including an electron-focusing element 47, a grid 48, and a cathode 49. This cathode 49 is preferably of the heater type including a closed metallic hood which is heated by a filament contained within the hood. As shown, the cathode 49 is heated by energy deriving from the battery Bc.

It will be seen that the positive terminal of a plate source (+) is connected to the anode 46. This is done in order to aid in the acceleration of the electrons as they leave the cathode 49 to eventually impinge upon the fluorescent screen S. The sweep plates 41—44 are of course used to sweep the electron beam illustrated by a dot-and-dash line 50 in a manner so as to scan this entire screen as is well known in the electronic and television art and in accordance with sweep voltages generated by sweep voltage or scanning generators SG and 40.

As illustrated, focusing of the electron beam is accomplished by adjusting the potentiometer including the resistance R1 which is energized by the direct current source Bp. It is thus seen that the sweep plates are energized from the saw-toothed generator 40 and from the scanning generator SG and that the grid 48 may be controlled by energy derived from the radio receiver presently to be described through the medium of the wire 58.

This receiver 25 comprises receiving apparatus of conventional form designed to receive ultra-high frequency radio energy of carrier frequency F2 which energy is then supplied, as through wire 51, to the amplifier and detector portion 30 of the receiving apparatus, where this radio energy is amplified and rectified after which its modulated resultant energy if of proper modulating frequency flows through one of the filters 52, 53 or 54 providing the received energy is modulated to one of these frequencies $f1$, $f2$ or $f3$. If this modulating frequency is of frequency $f1$, for instance, it will flow through altimeter operated contact 57 and wire 58 to the grid 48 of the cathode-ray tube K. This flow of energy will fire the tube K, so to speak, to thereby render the electron beam 50 very pronounced, as a result of which a lighted spot will appear at that point on the screen S where the electron beam 50 is pointing at that time.

Let us now consider the question of how radio energy is generated on the airplane for transmission to a ground located radio receiver through the medium of antennas TA1 or TA2. As conventionally shown by the modulated energy emitted by transmitting antenna TA1 (Fig. 1 and graph 76, Fig. 5) this radio energy is of ultra-high carrier frequency and of a modulating frequency preferably considerably above the audio range.

Referring to Fig. 1, the block diagram 55 illustrates a well-known ultra-high frequency radio oscillator for generating such ultra-high frequency current preferably of a frequency F1. This carrier frequency may be generated by tube oscillators well known in the art as, for instance, are described at pages 480 to 530 of "Radio Engineer's Handbook" by Terman, 1943 edition by McGraw-Hill Book Co.; or at page 484 of "Television" by Zworykin and Morton, 1940 edition by John Wiley and Sons, New York. See also pages 192–215 of "Fundamentals of Radio" also by Terman.

Since, however, this radio carrier frequency is desired to be only intermittently applied this carrier frequency generator (for generating frequencies F1) is preferably intermittently fired as through the medium of a gas filled tube, such as a thyratron, receiving energy from the pulse generator 65. This pulse generator 65 is of well-known construction and may be of any suitable construction such for instance as disclosed on pages 514 and 515 of the "Radio Engineer's Handbook," by Terman, 1943 edition, or as disclosed on pages 214 and 215 of "Fundamentals of Radio," 1938 edition, also by Mr. Terman. This pulse generator, if of electronic construction, is preferably controlled by a scanning frequency generator generating scanning radio energy of frequency Fs and conventionally shown by block 60 in Fig. 1 of the drawings. Since it is desired to make a vertical electron beam sweep at the instant a radio impulse is transmitted toward a ground located radio receiver it is of course understood that the electron beam 50 of the cathode-ray tube K must also be synchronized with the pulse generator 65. For this reason the saw-tooth generator 40 is fired by current derived from the pulse generator 65. This saw-tooth generator then generates current of saw-tooth configuration as illustrated at pages 416-419 and 514-515 of "Fundamentals of Radio" and "Engineer's Handbook," respectively and as shown by graph 74 in Fig. 5 of the drawings.

It will be seen that the carrier frequency generator 55 which generates ultra-high radio carrier frequency, causes this high frequency energy to flow into a mixer and amplifier unit 20 at which point this radio carrier frequency is modulated to modulating frequencies $f1$, $f2$ or $f3$ depending upon the position then assumed by the altimeter controlled contact 59. For further information as to this altimeter controlled contact attention is directed to our prior application, Ser. No. 547,175, filed July 29, 1944. These modulating frequencies $f1$, $f2$ and $f3$ are produced through the medium of filters 61, 62 and 63 respectively. For methods of modulation by either heterodyne (p. 233) or the amplitude method (p. 219) attention is directed to these pages of "Fundamentals of Radio" referred to above.

Referring now to Figs. 5 and 5A of the drawings, attention is directed to the fact that the voltage curve or graph 70 generated by the scanning generator SG is of a form substantially as illustrated in Fig. 5A of the drawings whereas the graph 71 illustrates the wave form of a sine wave scanning frequency voltage generated by scanning frequency generator 60. The graph 72 illustrates the alternating pulse voltage first generated by the pulse generator 65, which graph is then followed by a graph 73 of the uni-polarity pulse pulsating current which is obtained by rectifying the voltage of graph 72. The saw-tooth graph 74 illustrates the wave form of the voltage generated by generator 40 and applied to the vertical sweep plates 41 and 43 when the lever 38 is in its normal solid line position. Graph 75 illustrates intermittent radiation of ultra-high frequency carrier frequency energy which is modulated at one of the modulating frequencies $f1$, $f2$ or $f3$ and graph 76 illustrates that ultra-high frequency radio energy originating at the ground located transmitter and transmitted to the receiving antenna RA1 or RA2 at all times. This received energy (graph 76) will not penetrate the receiving equipment unless it is modulated at one of the modulating frequencies $f1$, $f2$ or $f3$ and then only if the altimeter contact 57 assumes the position to select the filter 52, 53 or 54 which will pass such modulating frequency. This modulated carrier frequency is shown in enlarged form through the medium of the magnifying glass 80. A similar magnifying glass 81 has been illustrated to show on an enlarged scale one pulse of modulated radio energy emitted by the transmitting antenna TA1 or TA2.

*Ground located structures*

*Blind route flying structure.*—As disclosed in our prior application Ser. No. 547,175, filed July 29, 1944, which has resulted in Patent No. 2,458,361, dated January 4, 1949, it is proposed to have each route defined by successive fixes at each fix of which there is located suitable radio radiating means for controlling traffic indicating means on an approaching airplane. Also, as pointed out in connection with the airplane carried apparatus shown in Fig. 1 it has been proposed to radiate high frequency radio radiation of frequency F1 and to receive similar radio energy but preferably of frequency F2. The airplane carried apparatus is, however, not limited to such a construction and, if desired, the radiated and the received radio energies may be of the same carrier frequency. If the latter construction is employed the ground location may be provided with a radio reflector 85 (see Figs. 2 and 3) which consists of three smooth surfaced planes of radio reflecting material two of which are arranged at right angles to each other and the other serving to complete a box-like structure of hollowed-out pyramid form. It is understood that a radio reflector of this shape causes the radio energy to be reflected in substantially the same direction from which it was transmitted thereto. It is readily seen that if such reflector 85 were mounted permanently it would reflect the same kind of radio energy which was transmitted thereto, but if this reflector were mechanically operated so as to be effective to reflect intermittently, such operation might be carried out in code fashion so that if radio energy is transmitted thereto more or less continuously the reflected energy may be intermittently interrupted to characterize a code.

In Fig. 2 of the drawings an electromagnet including a coil 86 containing a movable core 87 acting on the end of a crank 88 which has its inner end fastened to the pivoted shaft 84 supporting the reflector 85 has been illustrated. It is readily understood that if the coil 86 is intermittently energized to characterize a code that it will through the medium of its core 87 intermittently operate the radio reflector 85 to positions where it is ineffective to reflect radio energy, so that the reflected energy will be coded in accordance with the intermittent energization of the coil 86. This mechanical coding of a reflector may be used to identify the fix as proposed in the prior application of Field, Wight and Saint, Ser. No. 517,814, filed January 11, 1944, or may be used to transmit conditions of traffic in advance of the fix to an airplane approaching the fix as disclosed in our prior application, Ser. No. 547,175, filed July 29, 1944.

Referring now to Fig. 4 of the drawings it will be seen that the apparatus therein disclosed includes a receiving antenna RA4 and a transmitting antenna TA4. These antennas are preferably somewhat directional although they are not sharply focused in that energy must be received through or transmitted over a spread of at least 90° in both a horizontal and a vertical plane. The receiving antenna RA4 is directly connected to a radio receiver 90 which is preferably tuned to respond only to radio of carrier frequency F1 and this receiver 90 also includes suitable amplifying and detecting apparatus, the detected energy of one or more modulating frequencies is applied to the primary winding 91 of a transformer Tr4. The secondary winding 92 of this transformer Tr4 has of course impressed voltage thereon of the modulated frequency or frequencies of the radio energy received by the antenna RA4, and this current insofar as one particular modulation frequency is concerned will then pass through a particular one of the various filters 93, 94, 95 depending upon whether this modulating frequency is of frequency $f1$, $f2$ or $f3$.

In accordance with one form of the present invention this current of a particular modulating frequency is then coded by suitable coding apparatus such as disclosed in our prior application, Ser. No. 547,175, filed July 29, 1944, and when so coded is applied to the mixer and amplifier unit 100 of the ground located radio transmitter including a carrier frequency generator 99. This carrier frequency generator generates a carrier frequency of frequency F2. Whether the energy emitted by the transmitter 99—100 is to be coded at a high coding rate, at a low coding rate or is to be transmitted non-coded depends upon the position of relays such as relays ALRP, ARP, CRP and TRP the control circuits for which relays are disclosed in our prior application, Ser. No. 547,175.

It is readily seen that under normal conditions the modulated current of frequency $f1$ which is flowing from the receiving apparatus to the transmitting apparatus of Fig. 4 is coded at a low rate as determined by coding disc 101 and flows through a circuit including back contacts 102 and 103 of approach relays ALRP and ARP respectively. If either of these approach relays ALRP or ARP is in its energized condition the modulated current will flow to the transmitting apparatus uncoded through a circuit including either a front contact 102 of the relay ALRP or the front contact 104 of the relay ARP, and also including front contact 105 of relay TRP and back contact 106 of relay CRP. If, on the other hand, either the relay TRP is in its deenergized condition or the relay CRP is in its energized condition current may flow through the coding disc 108 to the transmitter 99—100 to thereby code the energy of modulating frequency $f1$ at a high coding rate signifying proceed traffic conditions.

It should be understood that under normal conditions the apparatus illustrated in Fig. 4 of the drawings continuously transmits radio energy of carrier frequency F2 but that under this normal condition this energy is neither modulated nor coded and therefore this energy cannot produce any effect on the airplane carried receiving apparatus of any airplane. If, on the other hand, this radio energy is modulated because the associated receiver 90 has received modulated energy from an airplane carried transmitter then this modulated energy may be detected by the airplane carried receiving apparatus and will produce on the fluorescent screen S (Fig. 1) thereof not only an image located on the screen in accordance with the location of the ground located apparatus under consideration with respect to the ground, but this image will also be either coded at a high or a low rate or will be left non-coded depending upon traffic conditions in advance of the fix at which the ground located receiver and transmitter are located.

*Fig. 14 modification.*—If it is desired to have the ground located radio transmitter transmit carrier frequency only when radio energy is received by the associated receiver 90 the transformer Tr4 (Fig. 4) may have its secondary winding 97 connected to a full-wave rectifier 110 the output leads of which are connected across a grid bias resistance 111 of a push-and-pull amplifier unit as shown in Fig. 14 of the drawings. This grid bias resistance 111 acts to produce potentials to counteract the effect of the second or suppressor grid 112 in the amplifying tubes T1 and T2 of a push-and-pull amplifying unit illustrated in Fig. 14 of the drawings. This push-and-pull amplifying unit is so constructed that if no current flows through the resistance 111 the grid bias of these tubes will be such as not to cause these tubes to function, but if direct current in excess of a predetermined minimum value flows in this resistance 111 the two tubes T1 and T2 of the push-and-pull amplifier unit will operate to thereby apply radio energy of carrier frequency F2 to the transmitting antenna TA4. This carrier frequency F2 is modulated depending upon the modulating frequency then received by the receiver 90 and which flows through a particular one of the filter 93, 94 or 95. This modulating current is then coded in accordance with traffic conditions in advance as determined by the approach relays ALRP and ARP and the traffic manifesting relays CRP and TRP. It should be understood that if desired, the coding in accordance with traffic conditions may be omitted and the system may be used for blind route flying and blind landing only.

*Blind landing structure.*—Before discussing the ground located blind landing structure illustrated in Figs. 6 to 13 inclusive it is deemed desirable to briefly refer to the airplane carried structure shown in Fig. 1 and observe how this airplane structure is used in connection with the apparatus shown in Figs. 6–13 inclusive. It will be remembered that the airplane carried structure shown in Fig. 1 is such that horizontal mechanical scanning may take place when the lever 38 is in its solid line position and that mechanical vertical scanning may take place when this lever 38 assumes its dotted position. Also, it will be remembered that a contact drum is provided to change the connections leading to the sweep plates of the cathode-ray tube K so that if the lever 38 assumes its normal position the mechanical sweep voltage derived from generator SG is applied to the horizontally acting sweep plates 42 and 44 and the saw-tooth voltage generated by the generator 40 is applied to the vertically acting sweep plates 41 and 43; whereas when the lever 38 assumes its dotted position the sweep voltage generated by the mechanical generator SG is fed to the vertically acting sweep plates 41 and 43 whereas the saw-tooth sweep voltage generated by the generator 40 is fed to the horizontal sweep voltage plates 42 and 44. We should now bear in mind that the apparatus shown in Fig. 1 and with its lever 38 assuming the dotted position functions so as to cooperate with the blind landing apparatus shown in Figs. 6–13 of the drawings. Under this condition vertical scanning is done mechanically and distances are plotted toward the right from a datum line 137 (Figs. 8–13).

Referring now to Fig. 6 of the drawings it should be understood that this is a plan view of a portion of an airport and illustrates by plan view a landing strip 120 which has, in the particular form illustrated, six radio radiators 121, 122, 123, 124, 125 and 126 such as disclosed in Fig. 4 of the drawings associated therewith. It will be seen that the radio radiators 121 and 122 are lined up with the longitudinal middle of landing strip 120, the radio radiator 121 constituting an entrance radiator whereas the radiator 122 constitutes an exit radiator for this landing strip 120. The letter A applied to radio radiators 123 and 125 signifies that the radio energy emitted thereby is coded by Morse code to characterize the letter A, and the N applied to the radio radiators 124 and 126 signifies that the energy emitted by these radiators is coded to charatcerize the letter N. It will be remembered that the letter A of the Morse code constitutes a dash followed by a dot whereas the letter N constitutes a dot followed by a dash and it is in accordance with these codes that these radiators 123—125 have their energy coded. It may be pointed out that these codes A and N are displaced in time phase in a manner so that the dot of the letter N will fall in the space between the dot and the dash of the letter A whereas the dash of the letter N will fall in the space between two successive code characters A as a result of which if both of these codes A and N are received in like volume they will blend together to produce a continuous non-coded reception of radio energy.

Referring again to Fig. 6 the screen S shown therein is the screen S of the cathode-ray tube K shown in Fig. 1 of the drawings. On this cathode-ray screen S are shown and preferably employed two horizontal lines 131 and 132. Remembering that mechanical scanning is done vertically during blind landing it should be understood that the line 131 represents a line of sight from the airplane toward the ground at an angle of say 3° with respect to the level ground. This is on the assumption that the associated scanning antenna is stabilized in a manner as clearly described in our prior application, Ser. No. 548,660, filed August 9, 1944. The electron impinging dot 134 shown on line 133 signifies the spot on the fluorescent screen S where the radio energy received from the two ground located radio radiators 123 and 124 strike the screen during scanning operation of the electron beam 50 (Fig. 1). This dot or image 134 has been illustrated perfectly round and non-coded to signify that the distances from the airplane scanning antenna to the two radio radiators 123 and 124 are exactly the same so that these two dots which would be present if the distances were unlike fall right on top of each other and blend out the codes so as to produce a single non-coded image as though there were only a single radio radiator, even though the spot is due to the two radio radiators 123 and 124. It will of course be remembered that distance plotting, meaning the time consumed in a radio impulse travelling from the airplane transmitter to the ground located receiver plus the time required for the radio energy generated at the ground location to reach the airplane carried receiver, is plotted in a horizontal direction on the cathode-ray screen S. The starting point of the electron beam sweep has been indicated by the vertical datum line 137 on the screen S, so that the distance from this vertical line 137 to the image 134 signifies the distance from the airplane to the ground located radio radiators 123 and 124. Had the two distances from the airplane to the radio radiators 123 and 124 been different the image 134 would have been divided into two different dots both located on the line 131 with one of these dots flashed to the letter A and the other one flashed to signify the letter N, and the image letter which in the assumed case is nearest to the vertical line 137 will signify the shortest distance and therefore it will signify that the airplane is flying on that side of the centerline of the landing strip 120 where the corresponding radiator 123 or 124 is located. Various conditions of approach of an airplane have been graphically illustrated in Figs. 8 to 13 inclusive and these various conditions will be discussed in connection with blind landing operation hereinafter.

Fig. 7 illustrates the landing strip 120 and two of the associated radio radiators 123 and 125 in cross section and elevation, respectively. It will be observed that a 3° glide path 128 and a 1½° glide path 129, both shown by exaggerated angles have also been illustrated in Fig. 7 of the drawings and that these glide paths intersect at the point 130.

*Operation*

*Blind route flying operation.*—Although no airplane course consisting of successive ground located apparatuses such as illustrated in Fig. 4 of the drawings has been shown it may be assumed that these ground located apparatuses one at each fix along a route will all be identical to that illustrated in Fig. 4 and that the antennas such as antennas RA4 and TA4 in Fig. 4 both located at the same fix will be so juxtaposed as to point rearwardly and upwardly with respect to the direction of travel over the route as conventionally shown in our prior application, Ser. No. 547,175. For convenience radio radiators 121 and 122 illustrated in Fig. 6 of the drawings may be assumed to represent two fixes of a ground route. These radiators 121 and 122 constitute apparatuses such as illustrated in Fig. 4 except that the energy transmitted thereby is not coded. The radiators 123—126 are of like construction except that their energies are coded to characterize the letters "A" or "N" as the case may be.

Referring more particularly to Figs. 1 and 4 of the drawings let us assume that an airplane equipped with apparatus conventionally as shown in Fig. 1 of the drawings flies over an air route and cooperates with successive ground located fix apparatuses such as shown in Fig. 4 of the drawings. As conventionally shown, the transmitting antenna TA1 (Fig. 1) is now emitting a carrier frequency impulse consisting of a carrier frequency F1 modulated to a carrier frequency f1. These radio impulses are of comparatively short duration and may represent a radio travel-distance-time of approximately one mile, or 1/186,000 second. By this is meant the radio impulse may be of a time duration so that the first wave of the impulse is one mile away from the transmitting antenna TA1 when the last radio frequency cycle if impulses leaves this transmitting antenna TA1. Also these pulses are preferably spaced so far apart in time that the preceding pulse which left the transmitting antenna TA1 or TA2 will have had time to be transmitted to the most remote ground located radio fix within radiating range and back again to the airplane receiving antenna RA1 before a second radio impulse is transmitted from the airplane. In practice this time in radio distance may of course vary in accordance with the wishes of the practitioner of the invention and may for example be assumed to be such a time as will allow the radio impulse to be transmitted to and from a ground located fix located 50 miles from the airplane under consideration. It is thus seen that the apparatus disclosed in Fig. 1 is proposed to transmit radio impulses and receive in response thereto newly generated radio impulses of a different carrier frequency, and that these impulses are to be transmitted for such duration and spaced such time apart that there is never more than one impulse existing in space between the airplane and the most distant ground located apparatus insofar as the identification of that particular apparatus and fix are concerned.

Referring now for a moment to the cathode-ray tube K (Fig. 1) it will be understood that the electron beam illustrated by dot-and-dash line 50 will normally impinge near the middle bottom part of the screen as indicated by the point 150. Referring now to Fig. 5A of the drawings it will be observed that the wave form of the scanning voltage generated by scanning generator SG and illustrated by the graph 70 represents a voltage which suddenly rises to a maximum then gradually falls to zero and then gradually falls to a minus value corresponding to said maximum. Since this voltage is applied to the horizontal sweep plates 42 and 44 of the cathode-ray tube K this scanning voltage 70 will cause the electron beam 50 to sweep back and forth horizontally across the screen S at the very extreme lower part of the screen. This sweeping electron beam 50 will, however, not produce an indication on the screen because it is of such minute intensity as not to be visible, this lack of intensity being due to the fact that the grid 48 of the cathode-ray tube K is not now activated.

Referring now to the saw-tooth graph 74 shown in Fig. 5 of the drawings it will be observed that the voltage of this saw-tooth graph gradually rises from zero to a maximum and then very suddenly falls from that maximum back to zero. This saw-tooth voltage illustrated by the graph 74, and generated by the saw-tooth generator 40, is applied to the vertical sweep plates 41 and 43 of the cathode-ray tube K. From this consideration it is readily seen that the electron beam 50 will be lifted during the gradual climb of the saw-tooth curve 74 until it reaches the top or even beyond the top of the screen S and then will be suddenly dropped to the bottom of the screen. This dropping of the electron beam is extremely fast and the grid of the cathode-ray tube is intended to be non-activated at this time. Since the frequency of the saw-tooth curve 74 shown in Fig. 5 is many times that of the frequency of the sweep voltage graph 70 shown in Fig. 5A it is readily seen that the electron beam 50 within the cathode-ray tube K will produce many, possibly 100 or more, very steep saw-teeth on the kinescope screen, the vertical sweep of these saw-teeth on the kinescope screen S being created by the saw-tooth voltage illustrated by graph 74 and generated by saw-tooth generator 40 whereas the horizontal motion to create these saw-teeth on the cathode-ray tube screen S in succession are due to the sweep voltage conventionally illustrated by the graph 70 of Fig. 5A of the drawings.

It is thus seen that the entire face of the screen S will be scanned during each cycle of the scanning voltage 70 (Fig. 5A) generated by the generator SG. In practice it is proposed to have the scanning frequency generated by this scanning frequency generator SG high enough so that the retention of the human eye will blend successive images into a non-flickering image and this frequency in practice has been found to be required to be at least 16 cycles per second and may be as high as 36 cycles per second. Since the number of vertical sweeps of the electron beam 50 to be displayed on the fluorescent screen S should be at least 100 the scanning frequency generated by the scanning generator SG, then the saw-tooth frequency would obviously be at least one hundred times as high as the scanning frequency of scanning generator SG.

Referring again to Fig. 5 of the drawings it will be observed that during each rapid fall of the sweep voltage generated by saw-tooth generator 40 and illustrated by graph 74 is in synchronism with the plus pulses of graphs 72 and 73 and is also in synchronism with the impulses of the carrier frequency F1 generated by generator 55 and illustrated by the graph 75. In fact both the saw-tooth generator 40 and the timing of the impulses of carrier frequency F1 is determined by block 55 (Fig. 1) are governed by pulse generator 65 (Fig. 1) which is controlled by scanning frequency generator 60. It is thus seen that the radio impulse emitted by antenna TA1 or TA2 will leave this antenna at the time the electron beam 50 in the cathode-ray tube K starts its climb from the bottom part toward the upper part of the screen S for a particular saw-tooth scan on the cathode-ray screen S. From this it is readily seen that if the impulse emitted by antenna TA1 strikes a nearby ground located fix apparatus that the re-radiated beam detected by the receiving antenna RA1 will activate the grid 48 of the cathode-ray tube K earlier than would be the case if the ground located fix apparatus were located at a more distant point. In other words, the one or more ground located radiators will be plotted at distances above the lower edge of the screen S in accordance with the distances that these ground located apparatuses are from the airplane. In other words, a ground located radio radiator will produce an image on the screen a distance above the lower part of the screen in accordance with the distance this radio radiator is from the airplane. Also, this image will be displayed in a horizontal direction on the screen depending on the particular scanning position then assumed by the rotating scanning antennas TA and RA. From this consideration it is readily seen that even though only a single impulse of radiant energy is emitted by the airplane carried radio transmitter and antenna that two impulses may be received from such single transmitted radio impulse. This is true by reason of the fact that the transmitted impulse may strike a plurality of ground located radio apparatuses and since the ground located radio apparatus nearest the airplane will cause its re-radiated impulse to reach the airplane first this first ground located radio radiator will have its image located at a lower point on the screen than will the image of the more distant ground located radio radiator. From this consideration it is readily seen that one or more ground located radiator images may be depicted on the same vertical line on the kinescope screen. For like reasons, a plurality of impulses may appear on the same horizontal line of the screen S. In other words, a large number of radio radiator images may be simultaneously displayed on the kinescope screen S.

In the foregoing discussion nothing has been said about the manner in which undesired radio impulses which may impinge upon the receiving antenna RA1 or RA2 are prevented from affecting the grid 48 of the cathode-ray tube K and in this connection it should be understood that the receiver-amplifier apparatus 25 is tuned to respond only to a carrier frequency presumed to be of frequency F2 and that such radio energy of carrier frequency F2 as is received will not reach the grid 48 of the cathode-ray tube unless this carrier frequency is modulated to the proper modulating frequency $f1$, $f2$ or $f3$ depending on the position then assumed by the airplane carried altimeter controlled contact 57 controlled by the altimeter AT. Also, the radio impulses which are transmitted by the transmitting antenna TA1 or TA2 are always of carrier frequency F1 and are modulated to a modulating frequency $f1$, $f2$ or $f3$ depending on whether the altimeter contact 59 assumes one or another of these three different altitude positions.

Let us now trace the movement of a radio impulse of carrier frequency F1 from the airplane through space to a ground location and then back again in the form of a modulated pulse in the carrier frequency F2 under the condition of altimeter contacts 59 and 57 assuming their solid line position. Let us first assume that the mechanical scanning apparatus including the scanning motor M, transmitting antennas TA1 and TA2 and receiving antennas RA1 and RA2 assume the straight-ahead position as conventionally shown in Fig. 1 of the drawings. Under this condition there is no potential on either of the horizontal sweep plates 42 and 44 and the electron beam 50 will assume the position 150 on the screen S. Let us also assume that the scanning frequency current generated by sawtooth generator 40 is rapidly falling at this time, at which time an impulse of carrier frequency energy of frequency F1 is generated by generator 55 and this energy impulse of frequency F1 flows into the mixer and amplifier 20, where this carrier frequency is modulated by a frequency $f1$ as determined by the tuned unit 61 which is then connected to the mixer and amplifier 20 by contact 59, from whence this modulated impulse of radio frequency F1 modulated at modulating frequency $f1$ is applied to the transmitting antenna TA1. As conventionally illustrated by the graph 152 (Figs. 1 and 5) this radio impulse will be directed through a comparatively narrow beam in a direction ahead of the airplane. Let us assume that this radio impulse strikes the receiving antenna RA4 (Fig. 4) and is detected thereby and since this antenna RA4 is connected to the receiver 90 which is also tuned to a carrier frequency F1 the received impulse may be amplified and detected so as to deliver current of modulating frequency $f1$ into the primary winding 91 of the transformer Tr4. This modulated energy of frequency $f1$ will of course be reproduced in the secondary winding 92 of this transformer T4 and may then flow freely through the filter 93 because this filter is tuned to allow free flow of frequency $f1$ whereas it will greatly restrict the flow of all other carrier frequencies. This current may then flow through back contacts 102 and 103 of approach relays ALRP and ARP, through the coding wheel 101, which codes the received energy at a low coding rate signifying normal traffic conditions, from whence this current of modulating frequency $f1$ and coded at a low coding rate will be applied to the input side of the mixer and amplifier 100 of a radio transmitter including a carrier frequency generator 99 generating carrier current of frequency F2. The current of modulating frequency $f1$ will then be mixed with the carrier frequency energy of frequency F2 so as to cause the antenna TA4 which normally transmits energy of carrier frequency F2 to be modulated during a period of time corresponding to the duration of the impulse received by the receiving antenna RA4. This modulated impulse portion of the received radio energy of carrier frequency F2 has been shown enlarged in the magnifying glass 80 in Fig. 5 of the drawings and will eventually reach the receiving antenna RA1 or RA2 on the airplane, from whence this modulated portion of the received carrier frequency F2 will after having been amplified and detected be capable of causing current flow of modulating frequency $f1$ through the filter 52, altimeter contact 57, wire 58 to the grid 48 of the cathode-ray tube K.

As shown in Fig. 5 a time $t$ will have elapsed between the time the radio impulse 152 (Figs. 1 and 5) left the transmitting antenna TA1 or TA2 until the received modulation 153 (Figs. 1 and 5) of modulating frequency $f1$ reached the receiving antenna RA1 or RA2. It may be assumed that during this time $t$ the electron beams 50 in the cathode-ray tube K moved from the location 150 to the location 154 (Fig. 1). From this consideration it is seen that by plotting twice the distance from the airplane to the ground located radio receiver vertically on the screen S the image of such ground located radio apparatus will be located on the screen substantially in accordance with its location in the field in advance of the airplane. That is, the nearer the fix is to the airplane the nearer to the bottom on this screen will the image of this fix appear and the farther that the fix is away from the airplane the higher will its image appear on the screen S.

For reasons heretofore given with reference to Fig. 4 of the drawings and particularly with reference to the coding wheels 101 and 108 shown therein, each of these images of ground located fixes will be flashed or coded to signify traffic conditions for that altitude in advance of such fix, so that the pilot of the airplane by interpreting these code flashes will be informed as to traffic conditions in advance in the particular altitude in which he is flying.

Let us now assume that the airplane under consideration equipped with the apparatus illustrated in Fig. 1 of the drawings has reached the airport at which it is to make a landing. Also, that the pilot lines his airplane up with the two radiators 121 and 122 illustrated in Fig. 6 of the drawings and files low enough so as to intercept the 3° landing glide path 128 (Fig. 7) within landing distance of the landing strip 120. The pilot will now operate his lever 38 (Fig. 1) to the dotted position to thereby cause the scanning shaft 11 to be disposed horizontally and to cause the connections to the deflecting plates 41—44 to be shifted through the medium of the contact drum 39 directly associated with the lever 38. Vertical mechanical scanning will now take place. Let us now consider the pilot landing his airplane with this lever 38 in its dotted position and by making reference to Figs. 6–13 of the drawings.

*Blind landing operation.*—As soon as the lever 38 has been operated from its solid line to its dotted position, the pilot having first properly lined up his airplane with the landing strip 120 and the radiators 121 and 122 he will find images displayed on this cathode-ray screen S of the radiators 121 and 122 but he will pay little attention to these two images. He will also see displayed an image 134 (Fig. 6) due to radiators 123 and 124 and an image 135 due to radiators 125 and 126. If these images 134 and 135 are perfectly still and non-coded the pilot is advised thereby that he is still lined up with the landing strip 120. He will observe the spot 134 approaching the line 131 and as soon as it reaches its line 131 the pilot is aware of the fact that he is now on the 3° landing glide path 128. He will then attempt to keep his spot 134 on this line 131 and will also maneuver his airplane sidewise when necessary so as to keep the spot 134 non-coded.

The screen S will then appear as indicated in Fig. 6 of the drawings.

As the airplane continues its movement down the glide path 128 the spot 134 continues its movement toward the left on the line 131 and we may assume that it has now reached the position illustrated in Fig. 8 of the drawings. The distance from the datum line 137 to the spot 134 on the screen reflects the distance from the airplane to radiators 123 and 124. Had, in the meantime, the pilot maneuvered his airplane to the right of the course defined by the longitudinal center line of the landing strip 120 the distance from the airplane to the radiator 124 would have been shorter than the distance to the radiator 123 and the image 134 would have separated into two images 134 of which the left-hand image is coded to the letter N and the right-hand image is coded to the letter A as conventionally illustrated in Fig. 11 of the drawings. If, on the other hand, the pilot would have maneuvered his airplane to the left of the course the distance from the airplane to the radiator 123 would have been shorter than the distance to the radiator 124 and the left dot of the two dots 134 would have been coded to the letter A whereas the right-hand dot would have been coded to signify the letter N as illustrated in Fig. 12 of the drawings. If now the pilot maneuvers his airplane toward the course defined by the longitudinal center line of landing strip 120 he will cause the two dots 134 to come into over-lapped relation so that the over-lapped portion thereof is non-coded with the left-hand crescent of the dot 134 coded to the letter A and with the right-hand crescent of this dot 134 coded to the letter N, as illustrated in Fig. 13 of the drawings.

Let us now assume that the pilot has advanced his airplane down the glide path 128 to the point where the screen S displays the image 134 as illustrated in Fig. 13 followed by perfect registration of the two images as shown in Fig. 8. Let us further assume that the pilot continues his flight down the glide path 128 until the image 134 reaches the vertical line 137 on his screen S as illustrated in Fig. 9 of the drawings. At this point in his travel, namely, with the spot 134 on the intersection of lines 131 and 137, the pilot is informed that his airplane is located at the intersection of the glide paths 128 and 129, namely, that he is located at the point 130 in space and at this time the spot 135 on his cathode-ray screen S, which is an image of the radiators 125 and 126, will just have reached the line 132 (Fig. 9). This spot has been between the lines 131 and 132 under all previously considered conditions as illustrated on the screen in Figs. 6, 8, 11, 12 and 13. The appearance of his screen under the conditions as now assumed is indicated in Fig. 9 of the drawings.

The pilot will now continue his flight in a manner to maintain the image 135 on the horizontal line 132 and if his airplane is maneuvered to so maintain the image 135 this airplane will glide down the more shallow glide path 129, assumed to be a one and one-half degree glide path. As the pilot continues his flight he will be aware of the fact that when the image 135 while moving on line 132 reaches the line 137 and with this image 135 non-coded, indicating that the distances from the airplane to the radiators 125 and 126 is equal, the pilot will be prepared to expect his wheels to touch the ground when this image 135 reaches the intersection of lines 132 and 137 on his cathode-ray screen. The pilot is thus enabled to first glide down a steep glide path 128 and will be informed when he reaches the intersection of this steep glide path and a more shallow glide path and he will thereafter be informed as to his progress over this more shallow glide path not only as to whether he is veering above or below this glide path but also as to whether he is veering to the left or to the right thereof. These glide paths may of course be of any suitable degree of declination. Furthermore, he will be definitely informed in advance just when the wheels of his airplane will engage the landing strip upon which he is to land. As above pointed out the mechanical scanning apparatus is preferably stabilized during this landing operation by apparatus such as disclosed in our prior application, Ser. No. 548,660, filed August 9, 1944.

*Selection of constants.*—In the foregoing discussion very little has been said about the constants to be employed, such as, carrier frequencies, modulating frequencies, length of carrier frequency impulse emitted by airplane equipment and time spacing of these impulses. If time intervals are expressed by distance of radio propagation during such time the problem of determining these constants becomes comparatively easy.

If we assume that the fixes for route flying are about 15 miles apart and that it is desirable to be sure to have images of at least two fixes on the fluorescent screen sometimes three and never four. Then if we assume that radio communicating range is limited to a distance of fifty miles ahead of the airplane we may then assume that the carrier frequency impulses be spaced apart 100 miles in radio travel distance, because each returned pulse must appear on the scanning line which created it. The sweep frequency would then be $$\frac{186,000}{100} = 1860 \text{ c. p. s.}$$

where 186,000 represents radio travel distance in miles during one second of time.

If we now assume that each impulse is of a duration 1/60 of the time from the beginning of one impulse to the beginning of the next impulse, then 100/60=1.66 miles is the length of an impulse expressed in radio travel distance. This then means that if cross radiation directly from the transmitting antenna to the receiving antenna on the airplane is possible a fix less than half that distance (⅚ mile) from the airplane cannot be indicated on the screen without this image over-lapping with the spot on the screen due to such cross-radiation.

If we now assume a carrier frequency of 600 megacycles (½ meter wave length) is used, then 1.66/186,000 x 600,000,000=5355 is the number of cycles of carrier frequency per impulse of carrier frequency.

If it be assumed that at least three cycles of modulating frequency should exist in each impulse of carrier frequency in order that this modulating frequency can be properly directed through filtering circuits then 5355/3=1785 is the number of cycles of carrier frequency per cycle of this lowest modulating frequency and 600,000,000/1785=335,000 c. p. s. is the lowest modulating frequency that can be used. Let us now see how the highest modulating frequency can be determined.

If at least 100 cycles of carrier frequency are desired to be present in each cycle of the highest modulating frequency, then $$600{,}000{,}000/100 = 6{,}000{,}000$$

is the highest modulating frequency that should be used.

The foregoing constants are merely exemplary and are not necessarily resorted to in practicing the invention. They have merely been mentioned to show how suitable constants may be arrived at, and it should be understood that constants of any other magnitude may be used, if desired.

Artificial horizon indicator

As an adjunct to the blind route flying and blind landing structure already described it may be desirable to indicate on the same cathode-ray screen a line defining an artificial horizon. For obvious reasons this artificial horizon indication may be either used with the blind flying and blind landing apparatus already described or may be applied to a separate cathode-ray tube, and for obvious reasons the blind flying and landing system already described may be used without the artificial horizon indicating features presently to be described. One of the advantages of employing the artificial horizon feature of the present invention with the blind route flying and blind landing apparatus is that the several indications will then appear on the same cathode-ray screen which is believed a decided advantage in that the pilot's eyes may be readily shifted from a blind flying indication to an artificial horizon indication and vice versa.

*Artificial horizon indicator—structure.*—Before describing the artificial horizon indicating structure illustrated in Fig. 15 of the drawings it may be desirable to refer to Figs. 16 to 23 inclusive to observe how the artificial horizon is to be indicated on the cathode-ray screen so as to better understand the purpose of some of the elements of this structure.

It will be remembered that the mechanical scanning apparatus during route flying mechanically scans the field of view in advance of the airplane by scanning horizontally whereas during a blind landing operation this same scanning apparatus scans mechanically vertically. For this reason the artificial horizon apparatus must function in two different ways in order to properly display the artificial horizon indication in the proper position, say near the top on the screen S under both conditions. In Figs. 16 to 19 inclusive high speed scanning is done vertically and for this reason the artificial horizon indication is superimposed on this vertical scanning whereas in the diagrams illustrated in Figs. 20 to 23 inclusive the high speed scanning is done horizontally and for this reason the artificial horizon indication is superimposed upon the horizontal scanning.

Referring again to Figs. 16 to 19 inclusive it will be observed by looking at the scanning lines thereon especially insofar as Figs. 18 and 19 are concerned that suitable jogs are superimposed upon the swinging electron beam so that this beam is modified in accordance with banking. That is, jogs in the scanning are made in accordance with the particular banked position the airplane is assuming at that time. Referring now to Fig. 17, firing of the electron gun of the cathode-ray tube occurs later or earlier, that is, appears raised and lowered on the screen in accordance with the nosing of the airplane at that time as indicated by the arrow 178. In other words, the average height of the numerous dots illustrated in Figs. 16 to 19 (see arrow 178) are placed at a height on the cathode-ray screen S in accordance with the extent of nosing of the airplane either above or below level flying whereas the extent of slant that these dots make on the cathode-ray screen depends on the extent of the banking of the airplane at that time. In Fig. 18 the heavy dots are slanted in a clockwise direction which indicates that the airplane is banked in a counter-clockwise direction; whereas in Fig. 19 the heavy dots are slanted in a counter-clockwise direction which indicates that the airplane is banked in a clockwise direction.

Referring now to Figs. 20–23 it will be observed that fast scanning takes place in a horizontal direction on the screen and it is of course understood that the heavy slanting lines shown in Figs. 22 and 23 indicate the artificial horizon under abnormal banked conditions. In both Figs. 22 and 23 the average height of the artificial horizon is indicated by the arrow 179 and this is dependent upon the extent of nosing of the plane either above or below level flying. In both Figs. 22 and 23 this arrow is located in its normal position indicating no nosing either above or below the horizontal flying plane. It is readily understood that in the second arrangement illustrated (fast horizontal scanning) shown in Figs. 22 and 23 that the slanting artificial horizon is not placed upon the screen by placing jogs in the regular movement of the electron beam but is accomplished by firing the cathode-ray tube throughout an entire high speed sweep and to fire the particular high speed sweep across the electron screen which conforms to the extent of nosing of the airplane at that time. This would of course result in a horizontal line across the cathode-ray screen (see Figs. 20 and 21) were it not for additional apparatus to be described hereinafter to make this line slant (see Figs. 22 and 23). In order to at times produce a slanting line on the cathode-ray screen not only is a particular electron beam sweep fired but it is also swung across the fluorescent screen in a diagonal direction. In other words, in the form of invention (fast horizontal sweeping) the indications of which are illustrated in Figs. 20–23 the electron beam is swept repeatedly horizontally across the fluorescent screen at successive higher altitudes on the screen until it reaches a height on the screen corresponding to the extent of nosing of the airplane and this particular electron sweep is then swept diagonally or slanting across the screen in accordance with the extent of banking of the airplane, the cathode-ray gun being fired at the same time.

By reviewing Figs. 16–23 it will now be readily understood that the extent of nosing of the airplane is indicated on the fluorescent screen by firing the electron gun at the proper point as determined by one of the sweep saw-tooth voltages and to modify the effect of the sweep plates of the cathode-ray tube as for instance by electromagnetic means, such as the electromagnets 175 and 176 indicated in Fig. 15 of the drawings, so as to produce sweeping results in the electron beam contrary to that due to the voltage applied to the sweep plates 41 and 43.

Referring now to Fig. 15 of the drawings it should be understood that the contact drum 170 corresponds to the contact drum 39 shown in Fig. 1 of the drawings and performs exactly the same function that is performed by drum 39 except for the fact that two additional contact segments 171 and 172 have been provided, to perform additional functions. These contacts 171 and 172 perform only functions associated with the artificial horizon indicating apparatus. The cathode-ray tube K1 is identical to the cathode-ray tube K shown in Fig. 1 of the drawings except for the added electron sweep magnets 175 and 176. These sweep electromagnets 175 and 176 although disposed horizontally in the cathode-ray tube produce vertical sweeping effects and therefore they modify the effect originally produced by the vertical sweep plates 41 and 43.

The artificial horizon indicating apparatus of course includes a gyroscope which manifests the extent to which the airplane has nosed from a normal level course and/or has banked from normal level flying. In Fig. 15 of the drawings such a gyroscope has been indicated by a gyro fly-wheel 180 pivotally supported in a box-like frame 181, which frame is gravitationally biased by a weight W and by pivots (one only being shown) 182 and is supported in a fork 183 which fork 183 is in turn pivotally supported in a bearing block 184 fixed to the airplane, as by a stub shaft 185. This gyro 180 is spun at a very high speed by a suitable electric motor or pneumatic turbine. It is readily understood that if the airplane is banked from its normal position the gyro 180 will remain in its normal position and therefore will cause rotation of the stub shaft 185 in its fixed bearing 184, to thereby cause up and down movement of the end of the bank gyroscope arm 186 with respect to the body of the airplane. Likewise, upward nosing of the airplane will cause the nosing gyroscope arm 187 to move downwardly with respect to the airplane whereas downward nosing of the airplane will cause upward movement of such nosing gyroscope arm 187. This nosing arm 187 is provided with a contact 188 which wipes over the resistance leg 189a of a potentiometer 189 the other resistance arm 189b being provided with a manually operable contact 190 the functions of which will be described hereinafter. It should be noted that this potentiometer 189 is supported by fork 183 through the medium of brace arms 177.

The bank gyroscope arm 186, on the other hand, through the medium of the push-and-pull rod 193 operates two single trees 194 and 195 which are pivoted fixedly to the airplane as through the medium of pivots 196 and 197. The ends of these single trees 194 and 195 are pivoted to and operate movable contacts 198 and 199 insulated from single trees 194 and 195 and engage opposite sides of a potentiometer resistance 200. From this construction it is readily seen that if the single trees 194 and 195 move in one direction from their normal position, and providing that direct current flows in the potentiometer resistance 200, voltage of one polarity will be detected by these contacts 198 and 199 whereas if the single trees are moved in an opposite direction from normal the polartiy detected by these contacts 198 and 199 will be reversed. In practice, alternating current of saw-tooth configuration will be applied to the potentiometer resistance 200 so that it is the relative polarity that is reversed.

In addition to the apparatus already described and illustrated in Fig. 15 of the drawings there are also provided amplifying tubes T1A and T2A. Although the tube T2A performs amplifying functions, it is primarily provided to obtain currents or potentials which vary in accordance with varying voltages applied from two different sources so as to produce a voltage or current which is a composite of the two in-put sources. Each of these tubes T1A and T2A is provided with a cathode 202, an anode or plate 203, and a grid 204. The tube T2A is provided with a second grid 205. This second grid 205 determines when the tube T2A may function whereas the grid 204 determines to what extent current variations shall exist in the plate circuit. The sweep generator SG illustrated in Fig. 15 is the same as that illustrated in Fig. 1 of the drawings; that is, the sweep voltage varies substantially equal amounts on each side of zero voltage. Similarly, high speed sweep saw-tooth generator 40 is the same as the saw-tooth generator 40 shown in Fig. 1 of the drawings except that this sweep voltage swings substantially to equal extents above and below zero voltage whereas in the Fig. 1 construction this voltage was intended to vary only in a positive direction. The swinging of the high speed sweep voltage both above and below the zero voltage base is due to the transformer Tr5 that has been added in Fig. 15.

In addition to the apparatus already mentioned there are also shown in Fig. 15 of the drawings two saturation transformers 206 and 207 of which the secondary winding 209 of the transformer 207 is connected through rectifier RR1 to the grid of the cathode-ray tube K1 when the contact drum 170 assumes its normal route flying position, namely, when the lever 38 shown in Figs. 1 and 15 of the drawings assumes its solid line position. The secondary winding 208 of the saturation transformer 206 is, on the other hand, connected to the grid of the electron gun of the cathode-ray tube K1 when the apparatus assumes its blind landing position, namely, when the lever 38 assumes its dotted position.

The primary winding 211 of transformer 207 is normally connected in the plate circuit including the plate 203 and including the cathode 202 of the amplifying tube T1A, this plate circuit also including the plate battery PB1. Whereas under blind landing conditions with the lever 38 assuming its dotted position the primary winding 210 of the saturation transformer 206 is included in this same plate circuit. It should be noted that the grid circuit including the grid 204 and cathode 202 of the amplifying tube T1A derives its potential from the composite potentiometer 189. Furthermore, it should be observed that this potentiometer 189 is at all times connected across and receives energy in accordance with the voltage applied across the vertical sweep plates 43 and 41 but that this voltage during normal conditions is derived from the high speed scanning saw-tooth generator 40 whereas under abnormal and blind landing conditions the voltage applied across the sweep plates 41 and 43 is derived from the low speed scanning generator SG.

Referring now to the sweep electromagnets 175 and 176 it will be observed that these electromagnets derive their energy from the secondary winding of transformer Tr6 to the primary winding of which is included in series in the plate circuit of the amplifying tube T2A and including the plate source PB2. The control grid 204 of this tube T2A is controlled in accordance with voltage picked off of potentiometer resistance 200a which voltage is at times of one polarity and at other times of the opposite polarity depending upon which direction from normal the banked gyroscope arm 186 is operated; and also depending upon the polarity of the voltage at that time applied to this potentiometer resistance 200a by one of the scanning voltage generators SG or 40. The grid 205 of the tube T2A receives its operating potential from the secondary winding 209 or 208 of saturation transformer 207 or 206 depending upon whether the apparatus assumes its normal route flying condition or assumes its abnormal blind landing condition, respectively.

*Artificial horizon indicator—Route flying Operation.*—Under blind flying conditions the lever 38 shown in Figs. 1 and 15 assumes its solid line position and under this condition the contact drum 170 assumes the position illustrated in Fig. 15 of the drawings.

Let us first consider the apparatus exactly as shown in Fig. 15 of the drawings under which condition the potentiometer 189 is fed by energy derived from the saw-tooth generator 40 whereas the potentiometer 200 derives its energy from the scanning generator SG. As shown the airplane is flying perfectly level so that the contacts 198 and 199 have zero potential applied across the same. From this it is readily seen that no energy is applied to the grid circuit of the amplifying tube T2A including grid 204, so that the electromagnets 175 and 176 are wholly de-energized in spite of the fact that grid 205 renders the tube T2A intermittently in condition to be operable. Although the airplane is nosing straight ahead in a level course the potentiometer 189 will supply saw-tooth energy to the grid circuit of the amplifying tube T1A this is due to the fact that the manually operable contact 190 assumes a higher position on resistance unit 189b than does the gyroscope operated contact 188 on the resistance unit 189a of the potentiometer 189. High speed sweep saw-tooth voltage is therefore applied to the grid 204 of the amplifying tube T1A, as a result of which high speed saw-tooth voltage is applied to the primary winding 211 of the saturation transformer 207. This saturation transformer is of a construction, well known in the art, whereby transforming action takes place when a predetermined amplitude point in the magnetizing current is reached, as a result of which a very short impulse of potential is applied to the grid 48 of the electron gun of the cathode-ray tube K1 at the proper point during the electron beam sweep, and this voltage will cause the electron beam to become active each time that the electron beam has swept to the altitude on the fluorescent screen as indicated by the arrow 178 in Fig. 16 of the drawings. It is thus seen that these various dots on the fluorescent screen will result in a horizontal line appearing on this screen at the normal height thereon as illustrated in Fig. 16 of the drawings. This normal height may be varied manually by adjusting the manually operable contact 190 of the potentiometer 189.

Let us now observe what will happen if the airplane noses downwardly to cause the contact 188 to be moved upwardly on the resistance unit 189a of the potentiometer 189. This upward movement of the contact 188 will obviously decrease the magnitude of the saw-tooth voltage applied to the grid 204 of the tube T1A. Decreased voltage will cause saturation of the saturation transformer 207 to take place later in the saw-tooth cycle as a result of which firing of the electron gun will take place later and the entire row of dots on the fluorescent screen of cathode-ray tube K1 will be positioned higher than they were in Fig. 16 of the drawings, namely, they will be located as shown in Fig. 17 of the drawings. Obviously upward nosing will produce a similar result but in an opposite direction.

Let us now assume that nosing of the airplane downwardly, as just considered, has been discontinued and that the contact 188 of the potentiometer 189 again assumes its normal position as shown in Fig. 15. Let us further assume that the pilot banks his airplane toward the left, as a result of which the bank gyroscope arm 186 moves downwardly. This downward movement of arm 186 will cause the contact 198 to move downwardly on the resistance unit 200a of the potentiometer 200 whereas the contact 199 moves upwardly on this same resistance unit. This will result in the application of scanning voltage from scanning generator SG of a magnitude depending on the extent of banking of the airplane and of a polarity depending on the direction of such banking. This scanning voltage is applied to the control grid 204 of the amplifier tube T2A but will be ineffective to produce any plate current until the grid 205 of this tube T2A has been rendered effective by voltage derived from the secondary winding 209 of the saturation transformer 207.

As mentioned in connection with level flying and nosing by reference to Figs. 16 and 17 it will be seen that the time of firing of the electron gun and therefore the time of functioning of the amplifier tube T2A takes place in accordance with the extent of nosing of the airplane as conventionally indicated by the arrow 178 in Figs. 16—19 of the drawings. In other words, the tube T2A functions when the vertical sweep voltage has reached the point as indicated by the arrow 178 of Fig. 18 of the drawings. Furthermore, the extent of maximum change of current flow in the plate circuit of tube T2A depend upon the particular part in the slow scanning sweep voltage cycle that is then existent. In other words, the swing of the plate current will be greatest at the beginning and end of the slow sweep cycle derived from scanning generator SG and will be zero at the middle of the long wave of this slow sweep cycle.

A maximum pulse of current flows in the electro-magnets 175 and 176 near the beginning of each slow sweep cycle, this will gradually reduce to zero by the time the middle of the saw-tooth is reached and will gradually get larger in the opposite polarity direction as the end of the saw-tooth voltage curve is reached. In other words, instead of having the vertical sweep of the electron beam follow a typical saw-tooth sweep, the inclined line of which are illustrated by the lines 215 in Fig. 18 of the drawings, this electron beam will be suddenly jogged up or down as indicated by the jogs 216 or 217, respectively, in Fig. 18 of the drawing. In other words, the electron beam will be located at points such as points 218, for instance, when firing of the electron gun takes place instead of being located in line with the arrow 178. Putting this in different language the amplifier tube T1A and its associated apparatus determines when firing of the electron gun shall take place due to manual adjustment of the contact 190 or due to nosing of the airplane as determined from the position assumed by contact 188, whereas modified forces produced by electromagnets 175 and 176, and modifying the effect produced by the sweep plates 41 and 43, determine where the electron beam shall be directed at the time this electron beam is being fired.

Referring now to Fig. 18 it will be seen that the resultant dots placed in the upper part of the fluorescent screen S will result in a slanting line across the face of the screen the slant of which is dependent upon the extent of banking of the airplane whereas the average height of this line above or below normal (see arrow 178) is dependent on the extent of nosing below or above level flying, respectively.

If the pilot now banks his airplane toward the right he will cause upward movement of the bank gyroscope arm 186 with respect to the airplane, thereby causing upward movement of the contact 198 and downward movement of the contact 199 so that the saw-tooth voltage applied to the grid 204 of the Tube T2A will be of opposite relative polarity from that when he banked toward the left. This will obviously cause the line produced on the fluorescent screen to be slanted in the opposite direction as indicated in Fig. 19 of the drawings.

It should be understood that this production of an image of an artificial horizon on the fluorescent screen will not interfere with proper indication of the route during route flying operation as described in connection with Fig. 1 of the drawings because the artificial horizon will only appear in the upper part of this screen whereas route indicating images will only appear in the lower part of the fluorescent screen.

*Artificial horizon indicator—Blind landing operation.*—Let us now assume that the lever 38 shown in Figs. 1 and 15 of the drawings is moved to its dotted position. This will not only cause the axis of the mechanical scanning shaft 11 (Fig. 1) to be moved to a horizontal position but will also cause the drum 170 (Fig. 15) to be operated to the reverse position. This reversing of the drum 170 causes the low speed scanning generator SG to be connected to the potentiometer 189 whereas the high speed saw-tooth generator 40 through transformer Tr5 has its output circuit connected to the potentiometer 200. And furthermore, this operation causes the low speed scanning generator SG to supply energy to the vertical sweep plates 41 and 43 of the cathode-ray tube K1 and causes the high speed saw-tooth voltage generator 40 to be connected to horizontal sweep plates 42 and 44. Furthermore, this operation of the contact drum 170 to its abnormal position causes the saturation transformer 206 to be substituted for the saturation transformer 207. This saturation transformer 206, the primary winding 210 of which is now included in series in the plate circuit for tube T1A, is energized by current related to the low speed sweep voltage derived from generator SG because the grid circuit of tube T1A derives its potential from potentiometer 189 and this potentiometer 189 is now connected across this low speed scanning generator SG.

If we now assume that the airplane is flying level and that high speed scanning in a horizontal direction across the fluorescent screen is taking place, the lever 38 assuming its dotted position because blind landing operation is being contemplated, we will observe from Fig. 20 that during one complete horizontal sweep of the electron beam across the fluorescent screen is rendered visible because the electron gun of the cathode-ray tube is being fired throughout this entire sweep. The particular high speed sweep of the electron beam across the fluorescent screen that is rendered visible is determined by the time of induction of current in the secondary winding 209 of the saturation transformer 207 and this is dependent on the amplitude of the voltage then applied between the contacts 188 and 190 of the potentiometer 189. Since this potentiometer 189 is now connected across the low speed scanning generator SG only one firing of the electron gun will take place during each complete scanning of the fluorescent screen. The time of firing is determined by the amplitude of this low speed sweep voltage which is also in part dependent on the construction of the saturation transformer 206. The apparatus is so constructed that for the same adjustment of the manually operable contact 190 and the automatically operable contact 188 of potentiometer 189 which caused the Fig. 16 indication will cause firing to take place at a height on the fluorescent screen as indicated by arrow 179 in Fig. 20 of the drawings. This height indicated by arrow 179 in Fig. 20 is the same as that indicated by the arrow 178 in Fig. 16 of the drawings. In other words, with the lever 38 assuming its dotted position the potentiometer 189, the saturation transformer 206 and the amplifying tube T1A determine at which time in a low speed sweep of the electron beam the electron gun of the cathode-ray tube shall be fired.

Since under the condition just assumed the contacts 198 and 199 of potentiometer 200 are located at the same point on the resistance unit 200ª no voltage is applied to the control grid 204 of the amplifying tube T2A so that no current will be produced in the electromagnets 175 and 176. From this consideration it will be understood that the particular sweep horizontally across the cathode-ray screen which occurred when firing of the electron gun took place was a perfectly horizontal sweep, because the sweep plates 41 and 43 alone determined the vertical position of the electron beam throughout its entire horizontal sweep at this time, because the electromagnets 175 and 176 which could have modified the action of these sweep plates 41 and 43 produced no such action because these electromagnets 175 and 176 were deenergized.

Let us now assume that the airplane under consideration noses upwardly as a result of which the contact 188 moves downwardly on the resistance unit 189ª of the potentiometer 189. This will cause increased amplitude of saw-tooth voltage to be picked off of potentiometer 189 by contacts 188 and 190. This increased saw-tooth voltage will cause the saturation transformer 206 to function earlier during a low speed saw-tooth voltage sweep and therefore will cause firing to take place earlier in an upward movement of the low speed scanning sweep of the electron beam, so that the horizontal line during which firing takes place will be located lower on the screen as is indicated by the heavy line in Fig. 21 of the drawings.

Let us now assume that the pilot banks his airplane to the left (direction of travel toward right in Fig. 15) to thereby cause the bank gyroscope arm 186 to be moved downwardly with respect to the airplane. This will cause the contact 198 to move downwardly and the contact 199 to move upwardly on the resistance unit 200ª of the potentiometer 200. Since this potentiometer 200 now receives its energy from the saw-tooth generator 40 and since the contacts 198 and 199 are positioned to pick off of potentiometer 200 such a saw-tooth voltage this saw-tooth voltage by being applied to the control grid 204 of the amplifying tube T2A will produce energy in the plate circuit of this tube T2A only when this tube T2A is rendered activatable by the application of potential to its grid 205. Since this potential on grid 205 is only present while the electron gun of the cathode-ray tube K1 is being fired, due to artificial nosing indication control, it will be apparent that the high speed sweep across the fluorescent screen will not be horizontal as determined by the sweep plates 41 and 43 alone but will be slanting because of the action produced by the sweep plates 41 and 43. That is, the action produced by sweep plates 41 and 43 will be modified by the action produced by the electromagnets 175 and 176. These electromagnets derive their energy from the transformer Tr6 the primary winding of which is included in the plate circuit of the tube T2A. From this consideration it will be apparent that the artificial horizon indication on the screen S will be slanting dependent upon the amplitude of the saw-tooth voltage picked off of potentiometer 200 which in turn depends on the extent of banking of the airplane as indicated in Fig. 22 of the drawings. The average height of this slanting line of course depends on the manual adjustment of contact 190 and the extent of nosing of the airplane. Had the airplane been banked in the opposite direction the direction of current flow in the electromagnets 175 and 176 would have been of reverse polarity and the slant of the illuminated sweep would have been in the opposite direction as indicated in Fig. 23 of the drawings.

In the foregoing discussion relative to Figs. 20-23 it was assumed that firing of the electron gun of the cathode-ray tube K1 would extend only during one complete horizontal sweep of the electron beam. It should, however, be understood that if the current impulse supplied to the grid 48 of the electron gun lasts for several sweeps that under this condition several cycles of saw-tooth current will flow in electromagnets 175 and 176 to cause several slanting sweeps to take place across the fluorescent screen S during banking of the airplane for each complete scanning of this screen S. If desired the firing impulses may be made long enough to cover more than one complete horizontal sweep. If desired that part of the fluorescent screen S on which the artificial horizon is indicated may produce an indication of different color. For image color determination attention is directed to page 344 of Radio Engineer's Handbook above referred to.

By referring to Fig. 1 of the drawings it will be observed that receiving antennas RA have been shown separately from the transmitting antennas TA. It is readily understood that since it is not contemplated to have transmission and reception to take place at the same instant suitable counter voltages may be induced into the receiving apparatus so as to neutralize the effect due to directly applied transmitting voltages caused by cross radiation. If desired, therefore, the receiving antennas may be dispensed with and a single pair of antennas may be used for both transmitting and receiving purposes.

Having thus shown and described a system for blind route flying and for blind landing and having shown how artificial horizon indicating means may, if desired, be superimposed on such system, it should be understood that the particular embodiment of the invention shown has been selected to exemplify the invention and to facilitate its description and that various changes, modifications and additions may be made to adapt the invention to any particular problem encountered in practicing the invention without departing from the invention so long as these modifications come within the scope of the following claims.

What we claim as new is:

1. In a navigation system for airplanes, an airplane carried cathode-ray tube including a screen, an electron gun for creating an electron beam and sweep structure for sweeping said electron beam in planes at right angles to each other, a transmitting and receiving antenna system effective to scan in one of the planes a vertical area in advance of the airplane, a sweep voltage generator operated in synchronism with the scanning by said antenna system and connected to sweep said electron beam in the plane in which the antenna scanning is effective, a pulse generator generating pulses at a rate much higher than the frequency of said sweep voltage generator, an altimeter switch for automatically selecting a distinctive modulation frequency in accordance with the altitude of the airplane, a modulated carrier frequency generator for generating carrier current selectively modulated in response to the modulation selected by said altimeter switch, said carrier frequency generator being effective in response to the respective pulses of said pulse generator to apply carrier wave pulses to said antenna system for transmission, a saw-tooth sweep voltage generator controlled in response to the respective pulses of said pulse generator and connected to sweep said electron beam in a plane at right angles to the plane of scanning by said antenna system, means for rendering said electron gun active in response to the reception of radio energy only when modulated at the modulation frequency selected by said altimeter switch, and ground located means effective in response to radio energy transmitted by the airplane for immediately retransmitting to the airplane radio energy of the same modulated frequency as is received.

2. In a navigation system for airplanes, an airplane carried cathode-ray tube including a screen, an electron gun for creating an electron beam and sweep structure for sweeping said electron beam horizontally and vertically, a transmitting antenna and a receiving antenna both constructed to scan horizontally an area in advance of the airplane, a sweep voltage generator operated in synchronism with the scanning of said antennas and connected to sweep said electron beam horizontally, a pulse generator for generating pulses at a rate substantially higher than the rate of scanning of said antennas, an altimeter switch effective to select a distinctive modulation frequency in accordance with the altitude of the airplane, a modulated carrier frequency generator for generating carrier current selectively modulated in accordance with the modulation frequency selected by said altimeter switch, said carrier frequency generator being rendered active in response to each pulse of said pulse generator to apply energy to said transmitting antenna for radiation, a saw-tooth sweep voltage generator controlled by said pulse generator and connected to sweep said electron beam vertically for each pulse of said generator, means for rendering said electron gun active in response to the reception of radio energy by said receiving antennas, only provided that such radio energy is modulated at the modulation frequency selected by said altimeter switch, and ground located means at successive spaced points along an airway effective in response to energy radiated from an airplane to transmit to that airplane a carrier wave modulated by the modulation frequency that has been received.

3. In a navigation system for airplanes of the character described, an airplane carried cathode-ray tube including a screen, an electron gun for creating an electron beam and sweep structure for sweeping said electron beam horizontally and vertically, a transmitting and receiving scanning antenna system normally active to repeatedly scan the area in advance of the airplane horizontally, a sweep voltage generator operated in synchronism with rotation of said antenna system and connected to sweep said electron beam horizontally, a pulse generator for generating pulses at a frequency substantially higher than the frequency of said sweep voltage generator, an airplane carried altimeter switch for automatically selecting a distinctive modulation frequency in accordance with the altitude of the airplane, a modulated carrier frequency generator for generating carrier current selectively modulated in accordance with the position of said altimeter switch, said carrier frequency generator being rendered intermittently active in response to said pulse generator to apply its output to said antenna system for transmission, a saw-tooth sweep voltage generator controlled by said pulse generator and connected to sweep said electron beam vertically once for each pulse of said pulse generator, means for rendering said electron gun active in response to the reception of radio energy by said antenna system, only provided that such radio energy is modulated at the frequency selected by said altimeter switch, and ground located means at respective stations spaced along an airway effective in response to radio energy transmitted by respective airplanes to immediately retransmit radio energy of the same modulated frequency as was received, whereby an indication is displayed on said screen as to the azimuth of the airplane heading with respect to the respective ground stations with which the airplane is communicating and as to the distance that airplane is from such ground stations, all without interference by simultaneous transmission to airplanes at other altitudes on the same carrier frequency.

4. In a route indicating and blind flying system, an airplane carried cathode-ray tube including a screen, an electron gun for creating an electron beam and sweep structure for sweeping said electron beam horizontally and vertically, an airplane carried transmitting and receiving antenna system constructed to scan in one plane a rectangular area in advance of the airplane, a sweep voltage generator operated in synchronism with the scanning of said antenna system and connected to sweep said electron beam of said cathode-ray tube in one plane, a pulse generator effective to generating pulses at a frequency many times that of the frequency of said sweep voltage generator, a carrier frequency generator rendered intermittently active in response to the respective pulses of said pulse generator, the output of said carrier frequency generator being applied to said antenna system for the intermittent radiation of carrier waves, a saw-tooth sweep voltage generator controlled by said pulse generator and connected to sweep said electron beam at right angles to the direction in which the electron beam is swept by the output of said sweep voltage generator, means for rendering said electron gun active in response to the reception of radio energy of a particular carrier frequency by said antenna system, ground located receiving and transmitting means responsive to radio energy radiating from an airplane for retransmitting radio energy to the airplane, and switching means effective when actuated to simultaneously shift the scanning plane of said antenna system ninety degrees and transpose the connections of the respective horizontal and vertical sweep structure of said cathode-ray tube.

5. In a route indicating and landing system for airplanes, an airplane carried cathode-ray tube including a screen, an electron gun for creating an electron beam and sweep structure for sweeping said electron beam horizontally and vertically, an airplane carried transmitting and receiving antenna system constructed to scan either a narrow rectangular horizontal area or a narrow rectangular vertical area as selected, a sweep voltage generator operated in synchronism with the scanning of said antenna system, irrespective of whether or not a horizontal or a vertical area is being scanned, a pulse generator for generating pulses at a rate many times the frequency of said sweep voltage, a carrier frequency generator rendered intermittently active in response to the respective pulses of said pulse generator and connected to apply carrier current to said antenna system for radiation, a saw-tooth sweep voltage generator controlled by the respective pulses of said pulse generator for sweeping said electron beam horizontally or vertically as selected, means for rendering said electron gun active in response to the reception of radio energy by said antenna system, ground located receiving and transmitting means for retransmitting radio energy in response to energy received from an airplane, and manually operable means for selecting said antenna system to scan said horizontal or said vertical area, said manually operable means being simultaneously effective to select the governing of said horizontal and vertical sweep structures by said sweep generator or said saw-tooth generator, whereby the scanning of the horizontal rectangular area by the antenna system can be selected for course flying, and the scanning of the vertical rectangular area by the antenna system can be selected for blind landing on a glide path.

6. In a navigation system for flying along an airway, the combination with a plurality of radio transmitting and receiving ground stations spaced along the airway, of airplane carried apparatus comprising, a cathode-ray tube having a screen and an electron gun and horizontal and vertical sweep structures, a first electron gun control means including radio transmitting and receiving means effective to govern the intensity of the electron beam formed by said electron gun in accordance with pulse communication with the respective ground stations, horizontal sweep circuit means governed by said transmitting and receiving means effective to plot on said screen along a horizontal coordinate substantially the azimuth of the respective ground stations in advance of the airplane, vertical sweep circuit means governed by said transmitting and receiving means for plotting distances of the airplane from the respective ground stations on said screen along a vertical coordinate, a second electron gun control means effective when rendered active to govern the intensity of the electron beam formed by said electron gun in accordance with another indication to be displayed on said screen, and means rendering said second electron gun control means active for each vertical sweep of said vertical sweep circuit means, only subsequent to the sweep voltage for that sweep having reached a predetermined potential.

7. In a system of the type described; an airplane carried cathode-ray tube including a fluorescent screen, electron gun and sweep means; antenna means supported by said airplane for transmitting and receiving radio pulses in and from a particular direction; means for sweeping an electron beam created by said gun in said tube across said screen; an altimeter switch effective to select a distinctive character of energization in accordance with the particular altitude at which the airplane is flying; means for causing one radio pulse to be emitted by said antenna means at the beginning of each sweep of said electron beam; said pulse being characterized as selected by said altimeter switch; ground located means for starting a radio pulse back to said airplane the instant the airplane emitted radio pulse reaches such ground located means; and means for creating such electron beam when said radio pulse reaches said antenna means, only provided that pulse is characterized as selected by said altimeter switch on that airplane; whereby a spot is created on said screen at a distance from the starting point of said electron beam sweep commensurate with the distance from said airplane to said ground located means, and whereby no spot is created on the screen as a result of radio communication by airplanes at other altitudes.

8. In a route indicating system for blind flying; airplane carried apparatus including an altimeter switch for selecting a single distinctive character of energization in accordance with the particular altitude at which the airplane is flying; airplane carried means for intermittently emitting radio energy characterized as selected by said altimeter switch; ground station apparatus including a radio receiver for detecting such energy and including a radio transmitter activated by such detected energy for radiating radio energy back to the airplane, said radio energy being characterized to correspond with the altitude indicated by the character of energy that is received from an airplane; and airplane carried means including receiving means responsive only to the single distinctive character of energization selected by said altimeter switch for directionally detecting said ground station radiated radio energy, said airplane carried means having a cathode-ray screen upon which is manifest in one plane the direction from which the ground station radiated energy was received and in a plane substantially at right angle thereto a distance commensurate with the distance from such airplane carried apparatus to said ground apparatus as determined by the time of transmission of such radio energy in both directions.

9. In a route indicating and landing system for blind flying and blind landing; airplane carried apparatus including an altimeter switch for selecting a single distinctive character of energization in accordance with the particular altitude at which the airplane is flying; airplane carried means for intermittently emitting radio energy characterized according to the selection by said altimeter switch; ground located apparatus including a radio receiver for detecting such energy and including a radio transmitter activated by such detected energy for radiating radio energy back to the airplane, said radio energy being characterized to correspond to the altitude indicated by the character of energy that is received from an airplane; airplane carried means for directionally detecting said ground station radiated radio energy, said airplane carried means having a cathode-ray screen upon which is manifest, only in response to the single distinctive character of energization selected by said altimeter switch, in one plane by suitable indicating means the direction from which the ground station radiated energy was received and in a plane substantially at right angle thereto a distance commensurate with the distance from such airplane carried apparatus to said ground located apparatus as determined by the time of transmission of such radio energy in both directions; and other airplane carried means adjustable for detecting directionally in a different plane the direction of the ground station from the airplane and correspondingly differently manifesting on said cathode-ray screen such direction and a distance commensurate with the distance from such airplane carried apparatus to such ground located apparatus.

10. In a system of the type described; an airplane carried cathode-ray tube including a fluorescent screen, electron gun and sweep means; an altimeter switch for selecting a single distinctive character of energization in accordance with the particular altitude at which the airplane is flying; a scanning shaft; means including said antenna; antenna means supported by said shaft for transmitting and receiving radio pulses characterized only as selected by said altimeter switch in and from a particular direction; means for sweeping an electron beam created by said gun in one direction across said screen in accordance with the rotation of said shaft and at right angle thereto at a much higher sweep speed; means for causing one radio pulse to be emitted at the beginning of each high speed sweep; ground located means for starting a radio pulse back to said airplane the instant the airplane emitted radio pulse reaches said ground located means, said radio pulse being characterized to correspond to the altitude indicated by the character of energy that is received from an airplane; and means for creating said electron beam only when said radio pulse is received by said antenna means having the particular distinctive character of energization selected by said altimeter switch on the associated airplane; whereby a spot is created on said screen at a distance from the starting point of said high speed sweep commensurate with the distance from said airplane to said ground located means and at a point crosswise of said high speed sweep on said screen dependent on the rotated position of said shaft.

11. In a route and artificial horizon indicating system of the type described; an airplane carried cathode-ray tube including a fluorescent screen, electron gun and sweep means; a scanning shaft; antenna means supported by said shaft for transmitting and receiving radio pulses in and from a particular direction; means for sweeping an electron beam created by said gun in one direction across said screen in accordance with the rotation of said shaft and at right angle thereto at a much higher sweep speed; an altimeter switch effective to select a single distinctive character of energization in accordance with the particular altitude at which the airplane is flying; airplane carried means for causing one radio pulse to be emitted at the beginning of each high speed sweep, said pulse being characterized as selected by said altimeter switch; ground located means for starting a radio pulse back to said airplane the instant the airplane emitted radio pulse reaches such ground located means, said radio pulse being characterized distinctively in accordance with the altitude indicated by the character of the pulse received from an airplane; airplane carried means responsive only to a pulse bearing said distinctive character selected by the altimeter switch on the associated airplane for activating said electron beam when said radio pulse reaches said antenna means; whereby a spot is created on said screen at a distance from the starting point at said high speed sweep commensurate with the distance from said airplane to said ground located means and at a point crosswise of said high speed sweep on said screen dependent on the rotated position of said shaft; and means including a gyroscope for indicating an artificial horizon on said screen.

12. In a system of the type described, an airplane carried scanning shaft, antenna means supported by said shaft for transmitting and receiving radio pulses toward and from a particular direction, an altimeter switch for selecting a single distinctive character of energization in accordance with the particular altitude at which the airplane is flying, means for causing radio pulses characterized as selected by said altimeter switch to be emitted by said antenna means intermittently during the movement of said shaft, ground located means for starting a radio pulse back to said airplane the instant the airplane emitted pulse is received by such ground located means, said ground located means being effective to characterize the pulse transmitted distinctively in accordance with the altitude indicated by the character of a pulse received from an airplane, and means including said shaft and said antenna means and a cathode-ray tube for manifesting on the screen of the cathode-ray tube, only in response to the reception of said single distinctive character of energization as selected by said altimeter switch on the associated airplane, the direction in which said ground located means is located with respect to said airplane and the distance such ground located means is from said airplane.

13. In a system of the type described; an airplane carried cathode-ray tube including a fluorescent screen, electron gun and sweep means; a vertically disposed scanning shaft; antenna means supported by said shaft for transmitting and receiving radio pulses in and from a particular direction; means for sweeping an electron beam created by said gun in a horizontal direction across said screen in accordance with the rotation of said shaft and in a vertical direction on said screen at a much higher sweep rate; means for causing one radio pulse to be emitted at the beginning of each vertical high speed sweep; ground located means for starting a radio pulse back to said airplane the instant the airplane emitted radio pulse reaches such ground located means; means for creating said electron beam when said radio pulse reaches said antenna means; and manually governed means for shifting the axis of said shaft ninety degrees to cause said shaft to be disposed horizontally, said manually governed means being simultaneously effective to cause the direction of scanning of said cathode-ray tube to be shifted on said screen substantially to an extent of ninety degrees.

14. In a system of the type described, airplane carried apparatus comprising, a cathode ray tube including a fluorescent screen, an electron gun and sweep means, an altimeter switch effective to select one of a plurality of distinctive modulation frequencies depending upon the altitude at which the airplane then is flying, a scanning shaft, antenna means supported by said shaft, radio transmitting and receiving apparatus including said antenna for respectively transmitting and receiving radio pulses in and from a particular direction, which radio pulses are of high carrier frequency and are modulated by that one of said modulating frequencies selected by said altimeter switch, said receiving apparatus being responsive to only the modulation frequency selected for the altitude at which the airplane is then flying, and circuit means for acting on said sweep means of said cathode ray tube for sweeping an electron beam created by said gun in one direction across said screen in accordance with the rotation of said shaft and also sweeping such beam at right angles thereto at a much higher sweep frequency, means for acting on said radio transmitting apparatus for causing a radio pulse to be emitted at the beginning of each high speed sweep; ground located radio receiving and transmitting apparatus effective upon the reception of a radio pulse of high carrier frequency and modulated for a particular flight altitude to re-transmit instantly a radio pulse of a different carrier frequency but correspondingly modulated, and airplane carried means for creating said electron beam when a radio pulse of said different carrier frequency is received by said antenna means, said airplane carried means being effective only provided that the pulse is modulated at a frequency characteristic of the particular flight altitude of the airplane as selected by said altimeter switch, whereby a spot is created on said screen at a distance from a starting point of said high speed sweep of said electron beam on said screen commensurate with the distance from said airplane to said ground located means and at a point crosswise of said low speed sweep of said electron beam on said screen dependent on the direction said ground located apparatus is from the airplane.

OSCAR S. FIELD.
SEDGWICK N. WIGHT.

REFERENCES CITED

The following references are of record in the file of this patent:

UNITED STATES PATENTS

| Number | Name | Date |
| --- | --- | --- |
| 2,114,283 | Anderson | Apr. 19, 1938 |
| 2,134,716 | Gunn | Nov. 1, 1938 |
| 2,189,549 | Hershberger | Feb. 6, 1940 |
| 2,252,083 | Luck | Aug. 12, 1941 |
| 2,262,033 | Moseley | Nov. 11, 1941 |
| 2,396,112 | Morgan | Mar. 5, 1946 |
| 2,403,603 | Korn | July 9, 1946 |
| 2,405,231 | Newhouse | Aug. 6, 1946 |
| 2,406,358 | Doba | Aug. 27, 1946 |
| 2,407,199 | Wolff | Sept. 3, 1946 |
| 2,408,848 | Hammond | Oct. 8, 1946 |
| 2,419,205 | Feldman | Apr. 22, 1947 |
| 2,421,747 | Engelhardt | June 10, 1947 |
| 2,422,182 | Bryant | June 17, 1947 |
| 2,422,697 | Meacham | June 24, 1947 |
| 2,432,101 | Shepherd | Dec. 9, 1947 |
| 2,444,452 | Labin | July 6, 1948 |
| 2,453,970 | Charrier | Nov. 16, 1948 |
| 2,480,123 | Deloraine | Aug. 30, 1949 |